United States Patent
Bedingfield, Sr.

(10) Patent No.: US 7,975,283 B2
(45) Date of Patent: Jul. 5, 2011

(54) PRESENCE DETECTION IN A BANDWIDTH MANAGEMENT SYSTEM

(75) Inventor: James Carlton Bedingfield, Sr., Lilburn, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 693 days.

(21) Appl. No.: 11/300,125

(22) Filed: Dec. 14, 2005

(65) Prior Publication Data

US 2006/0225106 A1    Oct. 5, 2006

Related U.S. Application Data

(60) Provisional application No. 60/667,018, filed on Mar. 31, 2005.

(51) Int. Cl.
H04N 7/173    (2011.01)
(52) U.S. Cl. .................................. 725/95; 725/12
(58) Field of Classification Search ............. 725/95
See application file for complete search history.

(56) References Cited

U.S. PATENT DOCUMENTS

| | | | |
|---|---|---|---|
| 4,017,676 A | 4/1977 | Rabeler et al. | |
| 4,380,687 A | 4/1983 | Stewart | |
| 4,439,784 A | 3/1984 | Furukawa et al. | |
| 4,769,697 A | 9/1988 | Gilley et al. | |
| 4,802,022 A | 1/1989 | Harada | |
| 4,903,130 A | 2/1990 | Kitagawa et al. | |
| 4,907,079 A | 3/1990 | Turner et al. | |
| 5,255,180 A | 10/1993 | Shinoda et al. | |
| 5,278,654 A | 1/1994 | Yang | |
| 5,313,282 A | 5/1994 | Hayashi | |
| 5,331,354 A | 7/1994 | Koyama et al. | |
| 5,731,764 A | 3/1998 | Tanaka | |
| 5,793,409 A | 8/1998 | Tetsumura | |
| 5,844,600 A | 12/1998 | Kerr | |
| 5,874,986 A | 2/1999 | Gibbon et al. | |
| 5,892,856 A * | 4/1999 | Cooper et al. | 382/291 |
| 5,995,153 A | 11/1999 | Moeller et al. | |
| 6,014,694 A | 1/2000 | Aharoni et al. | |
| 6,025,869 A | 2/2000 | Stas et al. | |
| 6,052,734 A | 4/2000 | Ito et al. | |
| 6,057,872 A | 5/2000 | Candelore | |
| 6,078,589 A | 6/2000 | Kuechler | |
| 6,147,992 A | 11/2000 | Giroir et al. | |
| 6,177,931 B1 | 1/2001 | Alexander et al. | |
| 6,216,956 B1 * | 4/2001 | Ehlers et al. | 236/47 |
| 6,237,022 B1 | 5/2001 | Bruck | |
| 6,240,460 B1 | 5/2001 | Mitsutake et al. | |

(Continued)

OTHER PUBLICATIONS

"The Cutting Edge of RFID Technology and Application for Manufacturing and Distribution", TEXAS Instrument TIRIS, Apr. 16, 2004, retrieved from http://www.ti.com/rfid/docs/manuels/whrPapers/manuf_dist.pdf, pp. 1-13.

(Continued)

*Primary Examiner* — Joseph P Hirl
*Assistant Examiner* — Jivka Rabovianski
(74) *Attorney, Agent, or Firm* — Cantor Colburn LLP

(57) ABSTRACT

Methods, devices, and computer program products are disclosed for conserving bandwith. If a presence of at least one individual is detected, then a stream of data is delivered to the multimedia device. If the presence of at least one individual is not detected, then the stream of data is degraded to conserve bandwidth.

20 Claims, 17 Drawing Sheets

U.S. PATENT DOCUMENTS

| | | |
|---|---|---|
| 6,260,111 B1 | 7/2001 | Craig et al. |
| 6,315,668 B1 | 11/2001 | Metke et al. |
| 6,324,182 B1 | 11/2001 | Burns et al. |
| 6,400,687 B1 | 6/2002 | Davison et al. |
| 6,480,753 B1 * | 11/2002 | Calder et al. ............... 700/83 |
| 6,591,423 B1 | 7/2003 | Campbell |
| 6,594,826 B1 | 7/2003 | Rao et al. |
| 6,609,253 B1 | 8/2003 | Swix et al. |
| 6,631,118 B1 | 10/2003 | Jones |
| 6,647,411 B2 | 11/2003 | Towell et al. |
| 6,717,507 B1 | 4/2004 | Bayley et al. |
| 6,741,563 B2 | 5/2004 | Packer |
| 6,757,796 B1 | 6/2004 | Hofmann |
| 6,796,787 B2 | 9/2004 | Okada |
| 6,810,528 B1 | 10/2004 | Chatani |
| 6,816,903 B1 | 11/2004 | Rakoshitz et al. |
| 6,839,052 B1 * | 1/2005 | Kramer ..................... 345/173 |
| 6,870,463 B2 | 3/2005 | Dresti et al. |
| 6,889,382 B1 | 5/2005 | Anderson |
| 6,973,066 B2 | 12/2005 | Gutowski |
| 7,000,246 B1 | 2/2006 | Takao |
| 7,065,586 B2 | 6/2006 | Ruttenberg et al. |
| 7,151,939 B2 | 12/2006 | Sheynblat |
| 7,277,894 B2 | 10/2007 | Kondo |
| 7,284,201 B2 * | 10/2007 | Cohen-Solal ............ 715/738 |
| 7,437,073 B2 * | 10/2008 | Kim et al. .................. 398/72 |
| 7,512,650 B2 * | 3/2009 | Richardson ............... 709/203 |
| 7,519,703 B1 * | 4/2009 | Stuart et al. .............. 709/224 |
| 2001/0031633 A1 | 10/2001 | Tuomela et al. |
| 2001/0043571 A1 | 11/2001 | Jang et al. |
| 2002/0002708 A1 | 1/2002 | Arye |
| 2002/0018645 A1 | 2/2002 | Nakamatsu et al. |
| 2002/0046099 A1 | 4/2002 | Frengut et al. |
| 2002/0080721 A1 | 6/2002 | Tobagi et al. |
| 2002/0083443 A1 | 6/2002 | Eldering et al. |
| 2002/0104087 A1 | 8/2002 | Schaffer et al. |
| 2002/0108127 A1 | 8/2002 | Lew |
| 2002/0133830 A1 | 9/2002 | Kim |
| 2002/0144259 A1 | 10/2002 | Gutta et al. |
| 2002/0164987 A1 | 11/2002 | Caronni et al. |
| 2002/0178440 A1 | 11/2002 | Agnihotri et al. |
| 2002/0194586 A1 | 12/2002 | Gutta et al. |
| 2003/0002862 A1 | 1/2003 | Rodriguez et al. |
| 2003/0004743 A1 | 1/2003 | Callegari |
| 2003/0028872 A1 | 2/2003 | Milovanovic et al. |
| 2003/0061619 A1 | 3/2003 | Giammaressi |
| 2003/0067554 A1 | 4/2003 | Klarfeld |
| 2003/0088878 A1 | 5/2003 | Rogers |
| 2003/0118029 A1 | 6/2003 | Maher, III et al. |
| 2003/0135544 A1 * | 7/2003 | Richardson ............... 709/203 |
| 2003/0154242 A1 | 8/2003 | Hayes et al. |
| 2003/0154246 A1 | 8/2003 | Ollikainen |
| 2003/0236745 A1 | 12/2003 | Hartsell et al. |
| 2004/0009761 A1 | 1/2004 | Money et al. |
| 2004/0013119 A1 | 1/2004 | MeLampy et al. |
| 2004/0071085 A1 | 4/2004 | Shaham et al. |
| 2004/0078814 A1 | 4/2004 | Allen |
| 2004/0125757 A1 * | 7/2004 | Mela et al. ................. 370/261 |
| 2004/0183749 A1 | 9/2004 | Vertegaal |
| 2004/0221304 A1 | 11/2004 | Sparrell et al. |
| 2004/0226034 A1 | 11/2004 | Kaczowka et al. |
| 2004/0255336 A1 | 12/2004 | Logan |
| 2004/0264563 A1 | 12/2004 | Inoue et al. |
| 2004/0266407 A1 | 12/2004 | Lee et al. |
| 2004/0268407 A1 | 12/2004 | Sparrell |
| 2004/0268410 A1 | 12/2004 | Barton |
| 2005/0002662 A1 | 1/2005 | Arpa et al. |
| 2005/0007965 A1 | 1/2005 | Hagen et al. |
| 2005/0022239 A1 | 1/2005 | Meuleman |
| 2005/0024543 A1 | 2/2005 | Ramaswamy et al. |
| 2005/0039219 A1 | 2/2005 | Cooper et al. |
| 2005/0066026 A1 | 3/2005 | Chen et al. |
| 2005/0081252 A1 | 4/2005 | Chefalas |
| 2005/0097595 A1 | 5/2005 | Lipsanen et al. |
| 2005/0108328 A1 | 5/2005 | Berkeland et al. |
| 2005/0144640 A1 | 6/2005 | Fritsch et al. |
| 2005/0183110 A1 | 8/2005 | Anderson |
| 2005/0266825 A1 | 12/2005 | Clayton |
| 2006/0013266 A1 | 1/2006 | Vega-Garcia et al. |
| 2006/0025151 A1 | 2/2006 | Karaoguz et al. |
| 2006/0028185 A1 | 2/2006 | Hernandez et al. |
| 2006/0056389 A1 | 3/2006 | Monk et al. |
| 2006/0095398 A1 | 5/2006 | Bhaskaran |
| 2006/0114360 A1 | 6/2006 | Kortum et al. |
| 2006/0125959 A1 * | 6/2006 | Yoshizawa et al. ........... 348/569 |
| 2006/0174266 A1 | 8/2006 | Gatto et al. |
| 2006/0184780 A1 * | 8/2006 | Yamada et al. ................ 713/1 |
| 2006/0195866 A1 | 8/2006 | Thukral |
| 2006/0204214 A1 | 9/2006 | Shah et al. |
| 2006/0221826 A1 | 10/2006 | Bedingfield et al. |
| 2006/0222015 A1 | 10/2006 | Kafka et al. |
| 2006/0222110 A1 | 10/2006 | Kuhtz |
| 2006/0225106 A1 | 10/2006 | Bedingfield |
| 2006/0251116 A1 | 11/2006 | Bedingfield et al. |
| 2007/0133603 A1 | 6/2007 | Weaver et al. |
| 2007/0136772 A1 | 6/2007 | Weaver et al. |

OTHER PUBLICATIONS

"Baggage Direct-Uses Tag-It, The World's First RFID-based Baggage Delivery System", Nov. 2000, Texas Instruments, 12 pages.

* cited by examiner

Attention!!!

The multimedia session was disconnected and substituted with local media content. The multimedia session will automatically be restored to full resolution when presence is detected.

FIG. 16

| | EMITTER 151 | DETECTOR 152 | PROCESSOR 153 |
|---|---|---|---|
| TOKEN 161 | ✓ | ✓ | |
| MOTION 162 | ✓ | ✓ | |
| EYE 163 | ✓ | ✓ | |
| HEAT 164 | ✓ | ✓ | ✓ |
| ENTRY/EXIT 165 | ✓ | ✓ | ✓ |

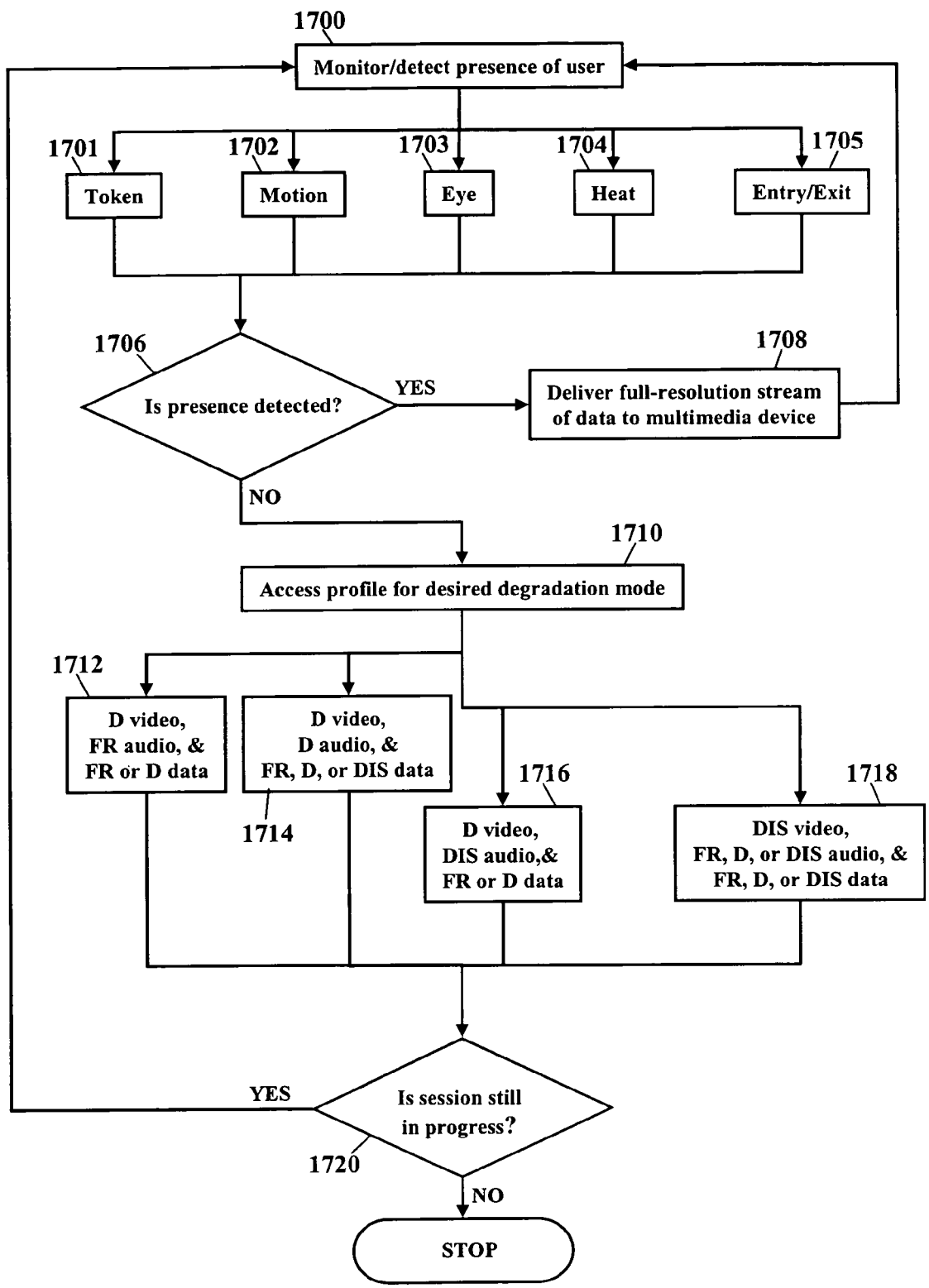

PRESENCE DETECTION IN A BANDWIDTH MANAGEMENT SYSTEM

CROSS REFERENCE TO RELATED APPLICATIONS

This application claims the benefit of applicant's co-pending U.S. Provisional Application No. 60/667,018 filed on Mar. 31, 2005, and of which is incorporated herein by reference.

Additionally, this application relates to a commonly assigned co-pending application entitled "Methods, Systems, and Computer Program Products for Providing Traffic Control Services" U.S. Ser. No. 11/304,264 filed simultaneously herewith, and of which is incorporated herein by this reference.

Additionally, this application also relates to a commonly assigned co-pending application entitled "Methods, Systems, and Devices for Bandwidth Conservation" U.S. Ser. No. 11/300,061 filed simultaneously herewith, and of which is incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to interactive multimedia distribution systems and, more particularly, to presence detection and management in such systems.

Bandwidth is becoming a problem in the communications industry. As subscribers demand more and more content, higher definition services, interactive services, and data services, the existing network infrastructure has trouble supplying adequate bandwidth. The industry is hard at work identifying new ways of increasing bandwidth. The industry is also striving to reduce wasted bandwidth.

An "always on" set-top box is one example of wasted bandwidth. An "always on" set-top box continually receives content on a channel, even while no one is watching television. When the set-top box remains powered "on" and tuned to a channel, the set-top box consumes bandwidth. Often times, however, that channel is not watched and bandwidth is wasted. Many cable subscribers, for example, forget to turn "off" their set-top box. Many subscribers power "off" the television, yet the subscriber forgets, or neglects, to power "off" the set-top box. So, the set-top box remains powered "on" and receiving content. It's not uncommon for a set-top box to continually receive a video stream while the subscriber sleeps for hours and/or vacations for days. No one is watching the content, yet the content is consuming three megabits or more per second of network bandwidth. This consumption reduces the efficiency of the network. Because so many subscribers waste bandwidth, there is a need in the art for reducing bandwidth consumption in multimedia distribution systems.

SUMMARY

The aforementioned problems, and other problems, are reduced, according to exemplary embodiments, by methods, systems, and devices that conserve bandwidth in communications networks. These exemplary embodiments describe how a multimedia service provider can reduce the occurrences of wasted bandwidth. Because so many subscribers fail to turn "off" a multimedia device that receives RF and/or digital content, these exemplary embodiments detect the presence of an individual. If the individual is present, then the exemplary embodiments deliver a stream of data to the multimedia device. If, however, the individual is not present, then there is little or no need for a full-resolution feed to the multimedia device. The exemplary embodiments, instead, degrade the stream of data to conserve bandwidth in the network. And, other exemplary embodiments, instead, terminate the stream of data to conserve bandwidth in the network. When the individual is again detected and present, then the exemplary embodiments restore the stream of data to full-resolution data rate and presentation to the multimedia device.

The exemplary embodiments conserve bandwidth. If the presence of an individual is detected, then a stream of data may be delivered to that multimedia device over a communications network. If, however, the presence of the individual is not detected, then the stream of data may be degraded to the multimedia device such that available bandwidth via the communications network is conserved. Alternatively, the stream of data may be terminated or substituted with local content, the multimedia device may be placed in a stand by mode or powered off, or a combination of these embodiments.

The exemplary embodiments also include a device that conserves bandwidth. The device comprises a processor communicating with means for detecting presence of an individual. The processor commands communication of a stream of data for presentation to a multimedia device. If the presence of the individual is not detected, then the processor degrades the stream of data to conserve bandwidth. Alternatively, the processor may terminate the stream of data or may substitute local content for presentation to the multimedia device. Still further, the processor may control the multimedia device such that the multimedia device may be placed in a stand by mode and/or powered off. According to some of the exemplary embodiments, the device may include a stand alone presence detector that communicates with the multimedia device, or, the presence detector may be integrated into the multimedia device as further described below.

The exemplary embodiments also include a computer program product for conserving bandwidth. The computer program product comprises a computer-readable medium and a presence detection application stored on the computer-readable medium. The presence detection application includes computer code for performing the steps: i) if a presence of an individual is detected, then delivering a stream of data to the multimedia device; and ii) if the presence of the individual is not detected, then degrading the stream of data to conserve bandwidth. The presence detection application may further include computer code for performing the following steps: iii) if the presence of the individual is not detected, then terminating the stream of data to conserve or otherwise free up bandwidth; iv) if the presence of the individual is detected subsequent to the stream of data being terminated and/or degraded, then delivering a fully restored stream of data to the multimedia device, and v) controlling power modes of the multimedia device such as power on, power off, and stand by.

Other systems, methods, and/or computer program products according to the exemplary embodiments will be or become apparent to one with skill in the art upon review of the following drawings and detailed description. It is intended that all such additional systems, methods, and/or computer program products be included within and protected by this description and be within the scope of this invention.

DESCRIPTION OF THE DRAWINGS

These and other features, aspects, and advantages of the exemplary embodiments are better understood when the following description is read with reference to the accompanying drawings, wherein:

FIG. 8 is a block diagram of exemplary details of the electrical device shown in FIGS. 1-7;

FIG. 16 is a schematic illustrating various exemplary configurations of the presence detector 13 according to further exemplary embodiments; and FIG. 17 is a flowchart illustrating a method of conserving bandwidth, according to exemplary embodiments.

DESCRIPTION

Figure 1:
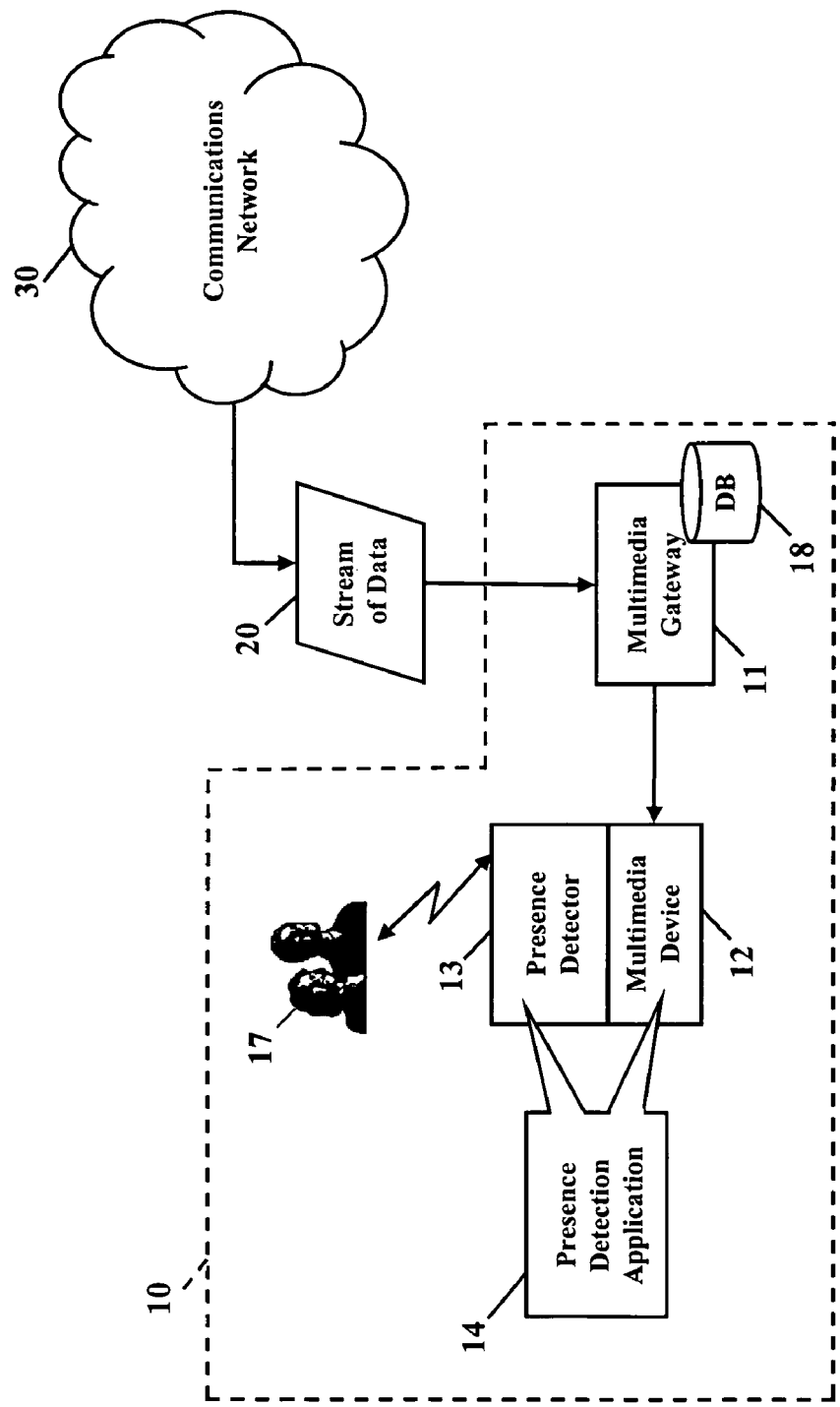
FIGS. 1-5 are schematics illustrating presence detection, degradation, and restoration according to some exemplary embodiments.

The exemplary embodiments now will be described more fully hereinafter with reference to the accompanying drawings. The reader should recognize, however, that the exemplary embodiments may be embodied in many different forms and should not be construed as limited to the embodiments set forth herein. These embodiments are provided so that this disclosure will be thorough and complete and will fully convey the scope of the exemplary embodiments. Moreover, all statements herein reciting exemplary embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods of the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the exemplary embodiments. Those of ordinary skill in the art further understand that the exemplary hardware, software, processes, methods, and/or operating systems described herein are for illustrative purposes and, thus, are not intended to be limited to any particular named manufacturer.

The exemplary embodiments describe methods, systems, and devices that conserve bandwidth in a communications network. These exemplary embodiments describe how to reduce the occurrences of wasted bandwidth within a communications network to multimedia device of an end user (e.g., a content service provider's communication of media to an Internet Protocol television of a subscriber or user). As used herein, the terms "end user," "subscriber," and "individual" are used to describe one or more persons that actively (e.g., by entering commands into the multimedia device) or passively (e.g., by sensing a presentation of media to the multimedia device) interact with the multimedia device. The exemplary embodiments detect the presence of an individual proximate to a multimedia device. If the individual is present, then the exemplary embodiments deliver a full-resolution version of the stream of data to the multimedia device. If, however, the individual is not present, then there is little or no need for a full-resolution feed to the multimedia device. Some of the exemplary embodiments, consequently, degrade the stream of data to conserve bandwidth in the network. When the individual is again detected and present, then the exemplary embodiments restore the stream of data to its full-resolution data rate. Other exemplary embodiments terminate the stream of data to conserve bandwidth in the network. When the individual is again detected and present, then these other exemplary embodiments restore the stream of data. When the stream of data is degraded or terminated, the multimedia device may present local content, present notification messages that the stream of data has been degraded or terminated, and/or enter a stand-by mode or power off.

FIGS. 1-5 are schematics illustrating operating environments according to some of the exemplary embodiments. FIG. 1 shows a home network (also referred to as a "local network") 10 that includes a multimedia gateway 11 receiving a stream of data 20 from a communications network 30. The multimedia gateway 11 communicates the stream of data 20 (also referred to as the "stream") to a multimedia device 12 coupled with a presence detector 13 (in other exemplary embodiments, the multimedia device 12 and the presence detector 13 may be an integrated device such as an interactive, programmable television with presence detection means). The multimedia device 12 and/or the presence detector 13 include a computer program product referred to as a presence detection application 14. The presence detector 13 detects or otherwise monitors for at least one individual 17 and operates with the presence detection application 14 to control or otherwise manage delivery of the stream 20 of data. The multimedia gateway 11 includes a database 18 (or alternatively a local server) of local media content that may also be accessed and communicated to the multimedia device 12.

The multimedia device 12 can be any device, such as a set-top box, a television, or an integrated television and set-top box. The multimedia device 12 may also be an analog/digital recorder, CD/DVD player/recorder, audio equipment, receiver, tuner, and/or any other consumer electronic device. The multimedia device 12 may also include any computer, peripheral device, camera, modem, storage device, telephone, personal digital assistant, and/or mobile phone. The stream 20 of data may be any RF and/or digital content, such as television/cable programming, mpg streams, or any other electronic content. The communications network 30 may be a cable network operating in the radio-frequency domain and/or the Internet Protocol (IP) domain. The communications network 30, however, may also include a distributed computing network, such as the Internet (sometimes alternatively known as the "World Wide Web"), an intranet, a local-area network (LAN), and/or a wide-area network (WAN). The communications network 30 may include coaxial cables, copper wires, fiber optic lines, and/or hybrid-coaxial lines. The communications network 30 may even include wireless portions utilizing any portion of the electromagnetic spectrum and any signaling standard (such as the I.E.E.E. 802 family of standards).

As FIGS. 1-5 show, the presence detector 13 detects or otherwise monitors for the presence of at least one individual 17. The presence detection application 14 is a computer program that processes information from the presence detector 13 to monitor input from at least one individual 17 to the multimedia device 12 and/or the presence of at least one individual 17 proximate to the multimedia device 12 (e.g., input communicated to or other interaction with the multimedia device 12 such as a command to change a channel, change a volume, and access a program guide, a motion sensor, a heat sensor, an eye or eye movement sensor, a token sensor, an entry/exit detector, and other means for detecting presence). The presence detection application 14 may be stored in a memory of the presence detector 13 or stored in memory 20 of the multimedia device 12. If the presence detector 13 receives electrical power from the multimedia device 12, then the presence detection application 14 may also monitor a state of the multimedia device 12, such as an electrically-powered "on" or "off" state. The presence detection application 14, for example, may measure electrical power consumption of the multimedia device 12. If the multimedia device 12 delivers a video output signal to the multimedia device 12, then the presence detection application 14 may measure an impedance change in the video output signal 24. The presence detection application 14 may alternatively or additionally control or otherwise change the state of the multimedia device 12 if the presence detection application 14 determines that at least one individual 17 is not present. Further, if the presence detection application 14 detects an input (e.g., change in channel, volume change, other control commands, such as fast forward, pause, rewind, access information, and others) from at least one individual 17, then at least one individual 17 is determined to be present. The presence detection application 14 may additionally or alternatively measure any current, voltage, resistance, electromagnetic field, or frequency to determine the presence of at least one individual 17 proximate to the multimedia device 12.

Figure 15:
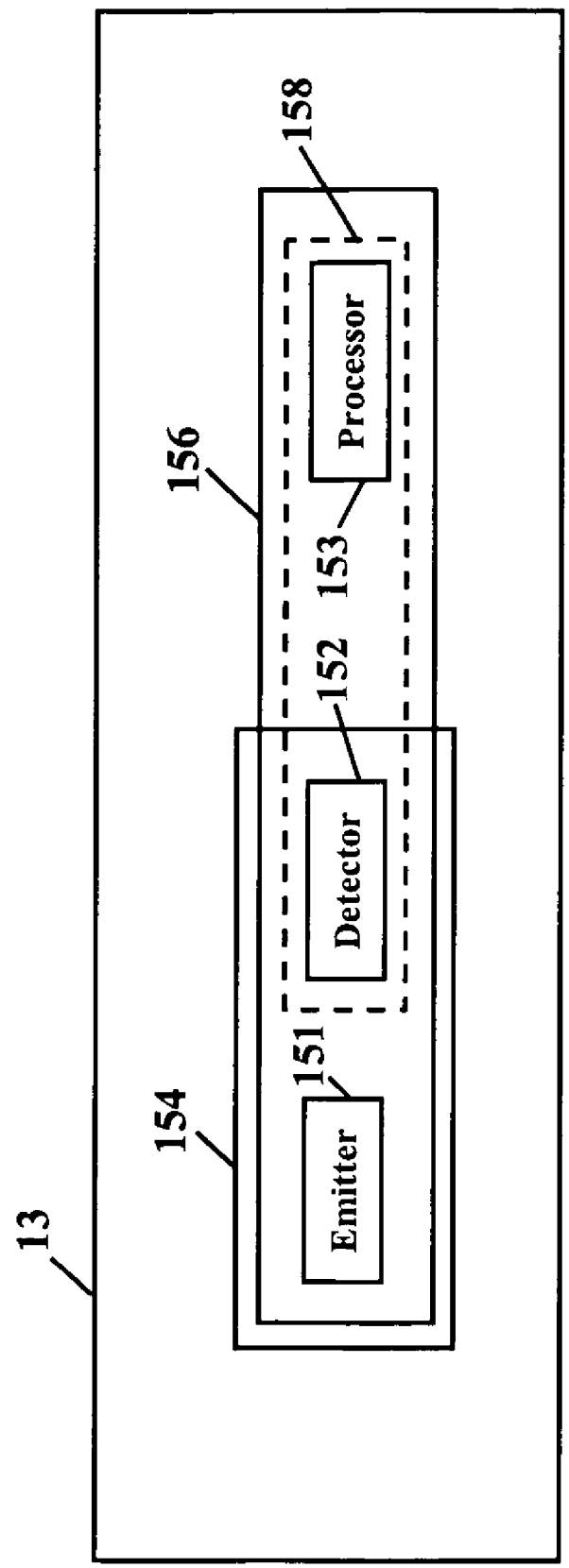
FIG. 15 is a schematic illustrating various simplified configurations of the presence detector 13 according to some of the exemplary embodiments.

The presence detector 13 may itself be any electronic device having an emitter, a detector, and/or a processor (shown as reference numerals 151, 152, and 153 in FIG. 15). The presence detector 13 and the multimedia device 12 may have a master-slave relationship, a peripheral relationship, or a component relationship. The presence detector 13 may itself be a set-top box, a television, or an integrated television and set-top box. The presence detector 13 may also be an analog/digital recorder, CD/DVD player/recorder, audio equipment, receiver, tuner, and/or any other consumer electronic device. The presence detector 13 may also include any computer, peripheral device, camera, modem, storage device, telephone, personal digital assistant, and/or mobile phone.

The presence detection application 14 conserves bandwidth. The presence detection application 14 determines when high bandwidth need not be allocated to the multimedia device 12 (or to the home network 10 via multimedia gateway 11). If the presence detection application 14 cannot detect the presence of at least one individual 17 (e.g., via user input signals and/or presence detector signals), then there is no need to communicate a high-bandwidth stream 20 of data from the communications network 30. As the following paragraphs will explain, when the presence of at least one individual 17 cannot be detected, the presence detection application 14 causes degradation in the stream 20 of data. The presence detection application 14 sends a degradation message 15 to a server 32. The stream 20 of data is sent by the server 32, and the degradation message 15 instructs a corresponding component of the presence detection application 14' in the server 32 to degrade the stream 20 of data. Because the stream 20 of data is degraded, bandwidth is conserved. According to some exemplary embodiments, when the presence of at least one individual 17 is subsequently detected, then the presence detection application 14' automatically cause a restoration in the data rate (e.g., bytes per second) of stream 20 of data. In alternate exemplary embodiments, when the presence of at least one individual 17 is subsequently detected, then the presence detection application 14 presents a prompt (e.g., visual and/or audio cue) to the multimedia device 12 such that the at least one individual 17 may respond to the prompt to restore the stream 20 of data. If the at least one individual 17 responds to the prompt or if the presence detection application 14 enables automatic restoration of the data stream, then the presence detection application 14 sends a restoration message 16 to the server 32, and the restoration message 16 instructs the server 32 to restore the data rate of the stream 20 of data.

Figure 2:
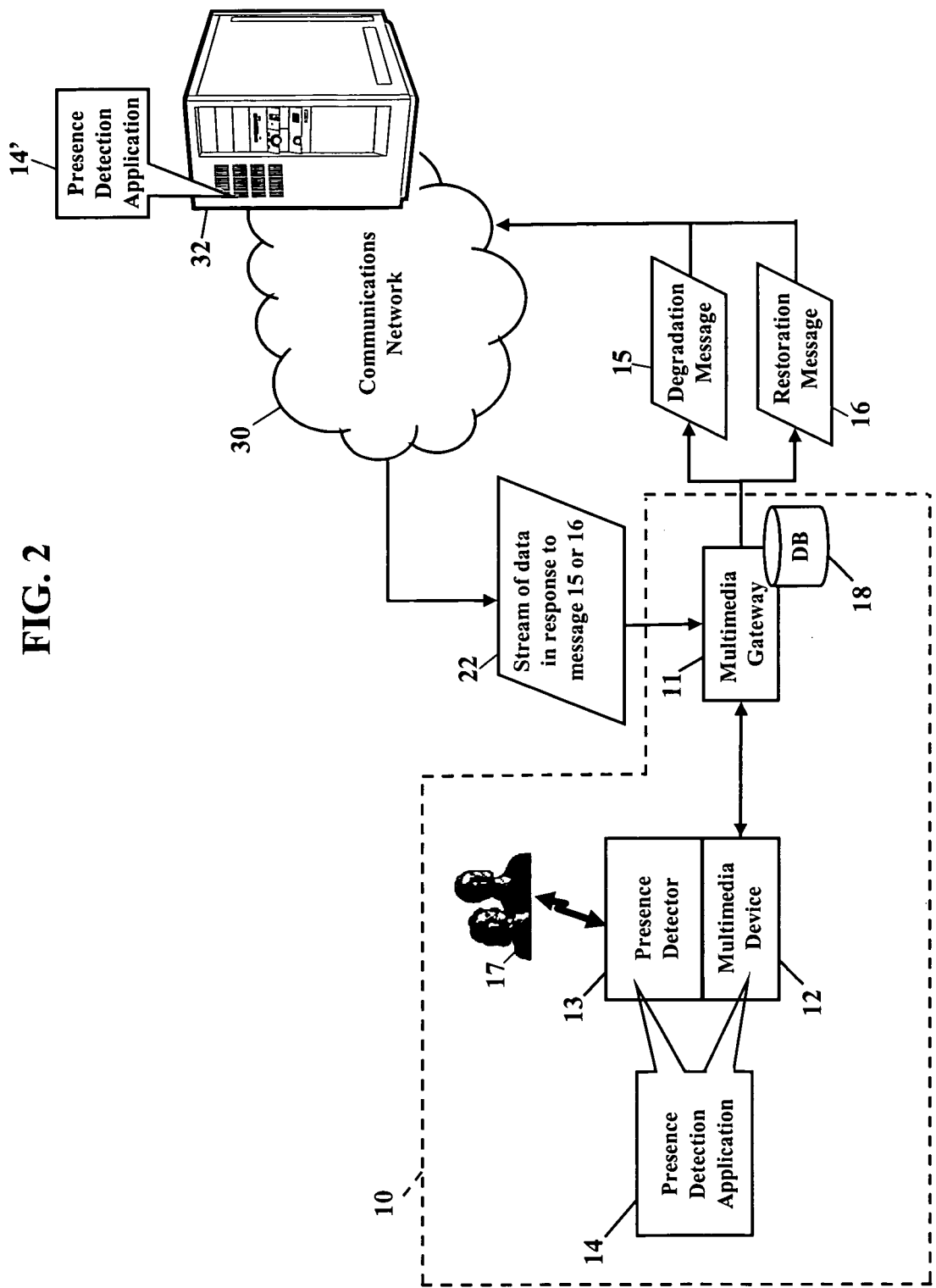
Figure 3:
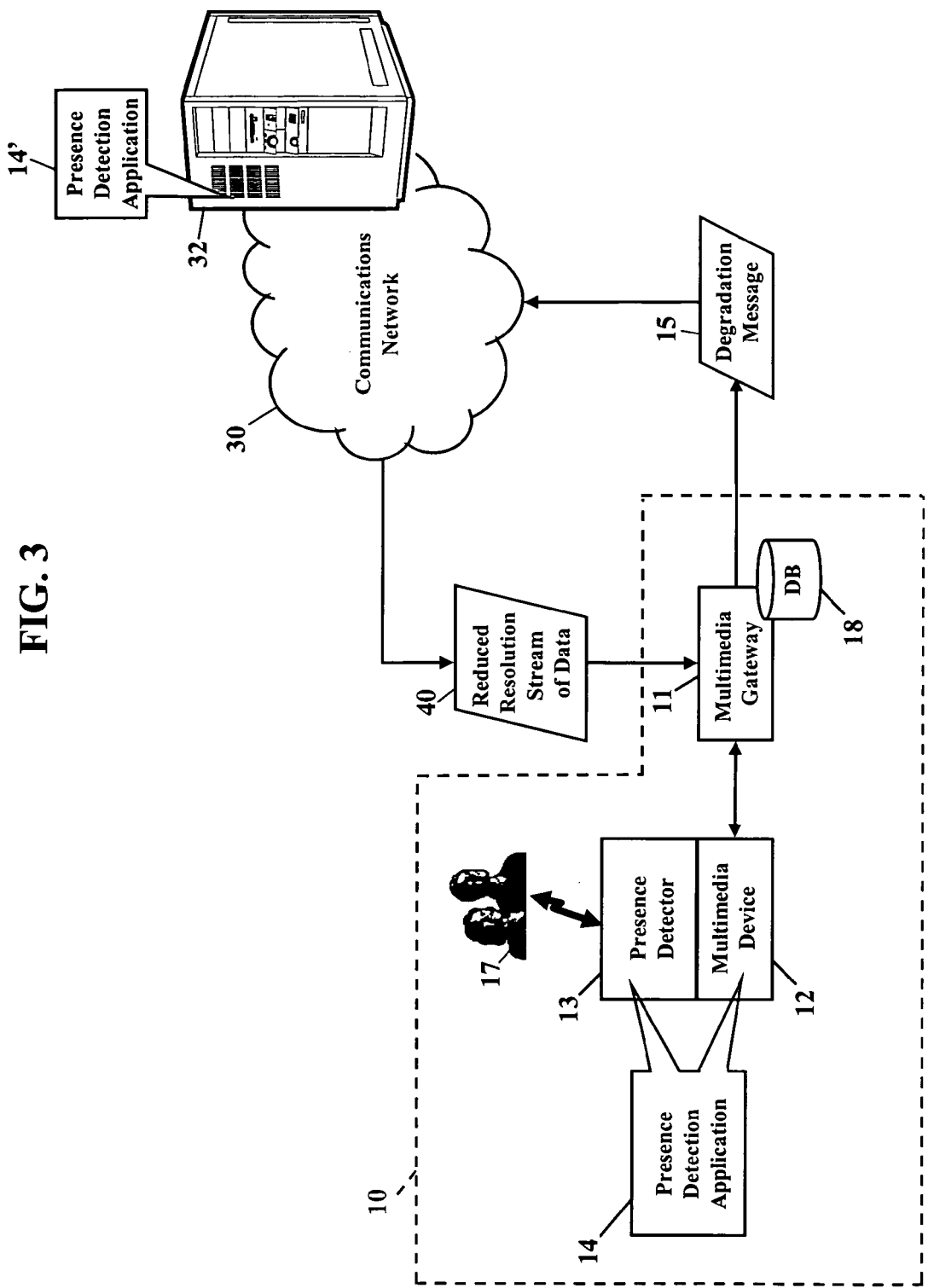
Figure 4:
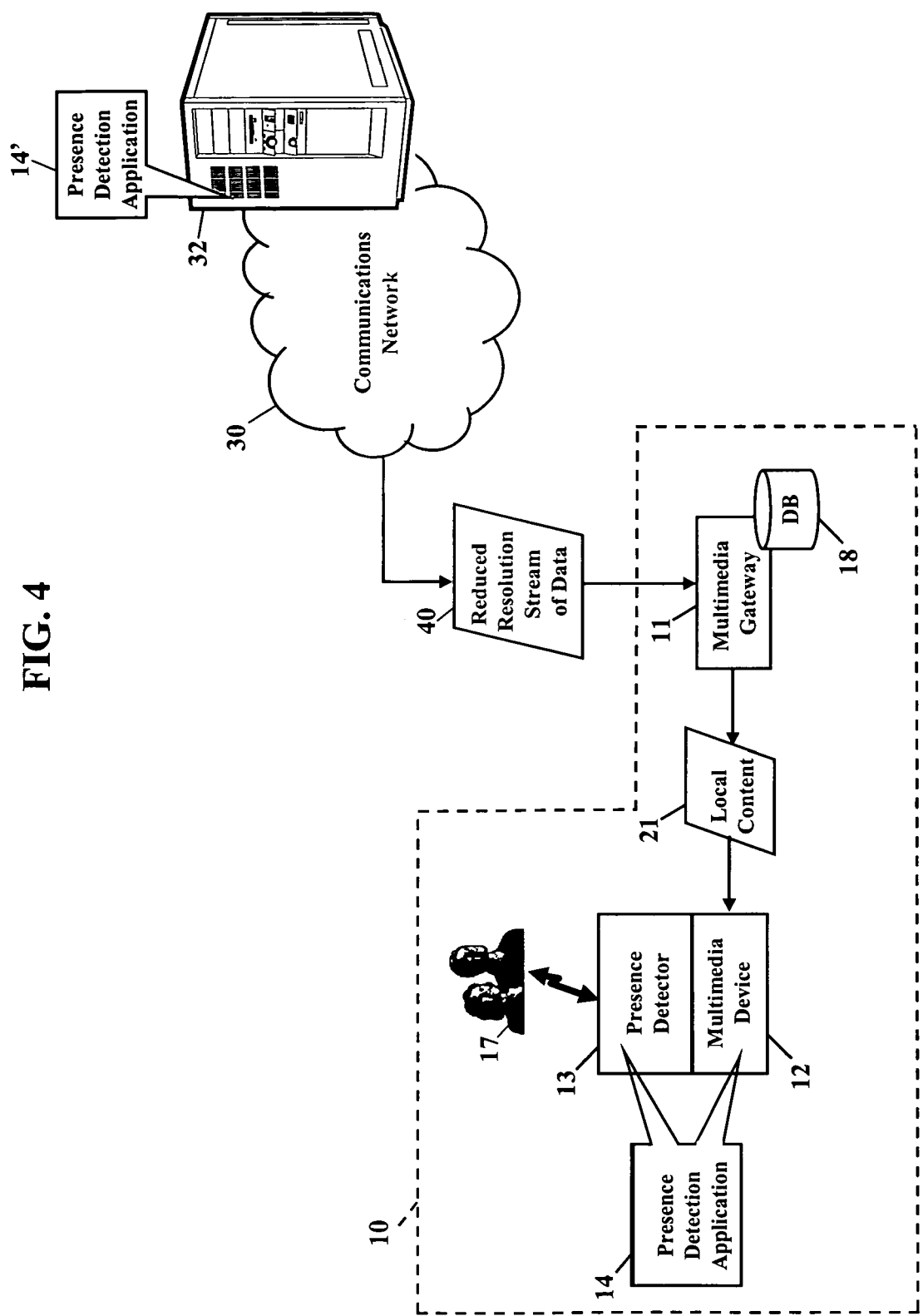

Referring now to an example of presence detection, degradation, and restoration, FIG. 1 shows the multimedia gateway 11 receiving the stream 20 of data from the communications network 30 and communicating the stream 20 of data to the multimedia device 12. FIG. 2 illustrates the presence detector 13 interacting with the presence detection application 14 to detect the presence of or otherwise monitor for at least one individual 17 such that the presence detection application 14 interfaces with the multimedia device 12 to communicate a degradation message 15 or a restoration message 16 to control or otherwise manipulate an altered stream 22 of data in response to the messages 15, 16. For example, FIG. 3 illustrates the degradation message 15. When the presence of at least one individual 17 is not detected, there is no need to send a full-resolution version of the stream of data (shown as reference numeral 20 in FIG. 1). Consequently, the presence detection application 14 sends the degradation message 15 to the server 32 via the multimedia gateway 13 and the communications network 30. The degradation message 15 instructs the corresponding server-based component of the presence detection application 14' to degrade the stream of data such that a degraded stream 40 of data is then processed and communicated from the server 32 to the multimedia gateway 11 and communicated from the multimedia gateway 11 to the multimedia device 12. The degraded stream 40 of data has a reduced data rate measured in bytes per second. Because the degraded stream 40 of data has a reduced data rate, the bandwidth allocated to the multimedia device 12 is reduced and reallocated to other uses within the communications network 30 and/or within the home network 10. According to exemplary embodiments of FIG. 4, the multimedia gateway 11 may access database 18 to select and communicate a stream 21 of locally stored content to the multimedia device 12 such that the multimedia device 12 continues to present media content without requiring allocation of bandwidth to the multimedia device 12.

Figure 5:
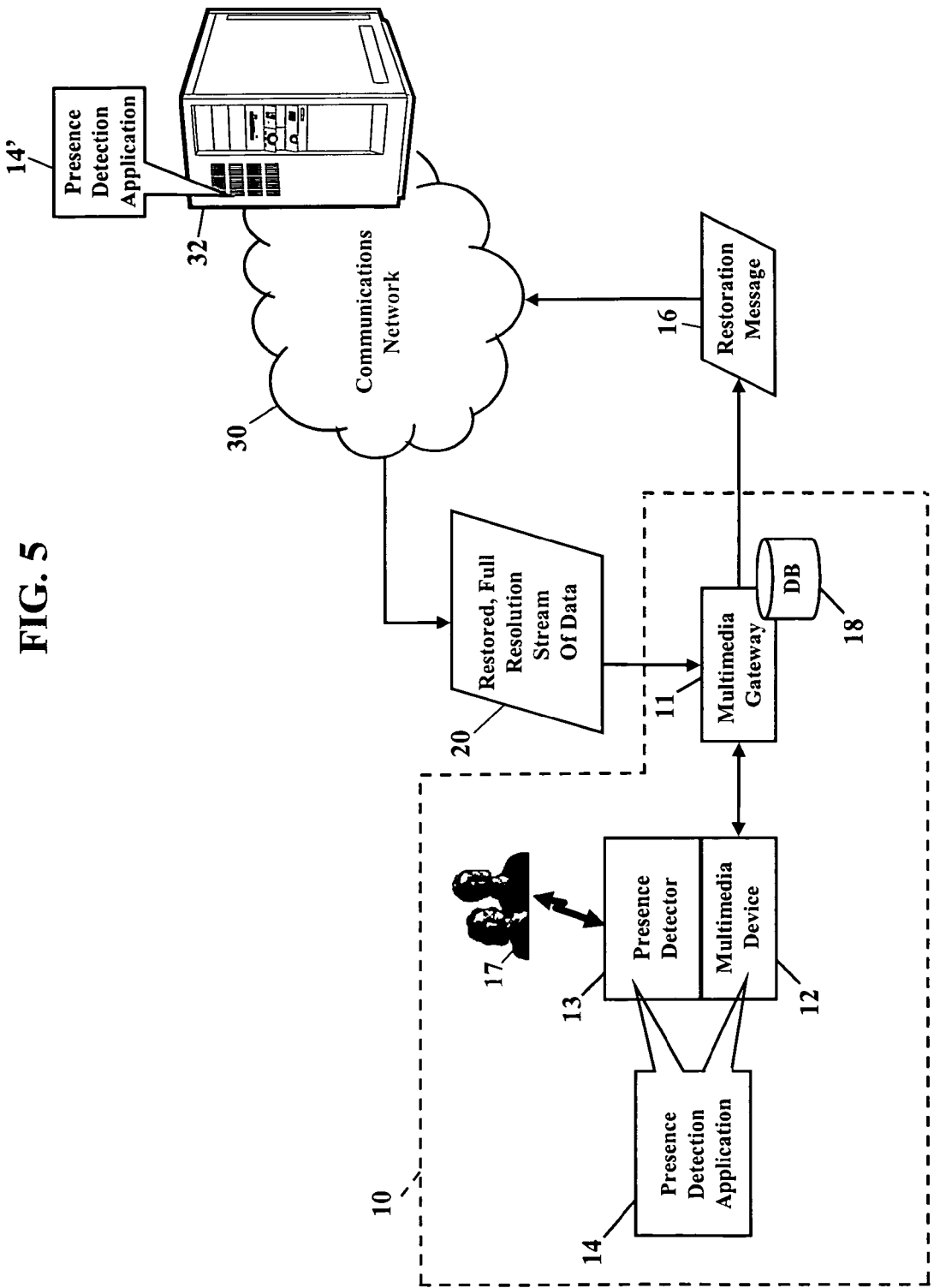

FIG. 5 is a schematic illustrating a restored stream 20 of data, according to exemplary embodiments. The presence detection application 14 may continually monitor for the presence of at least one individual 17 proximate to the multimedia device 12 or for an input to the multimedia device 12.

When presence is redetected, then the presence detection application 14 causes a restoration in the data rate (e.g., bytes per second) of the stream 20 of data. The presence detection application 14 sends the restoration message 16 to the server 32, and the restoration message 16 instructs the server-based presence detection application 14' to restore the full-resolution data rate of the stream 20 of data.

Figure 6:
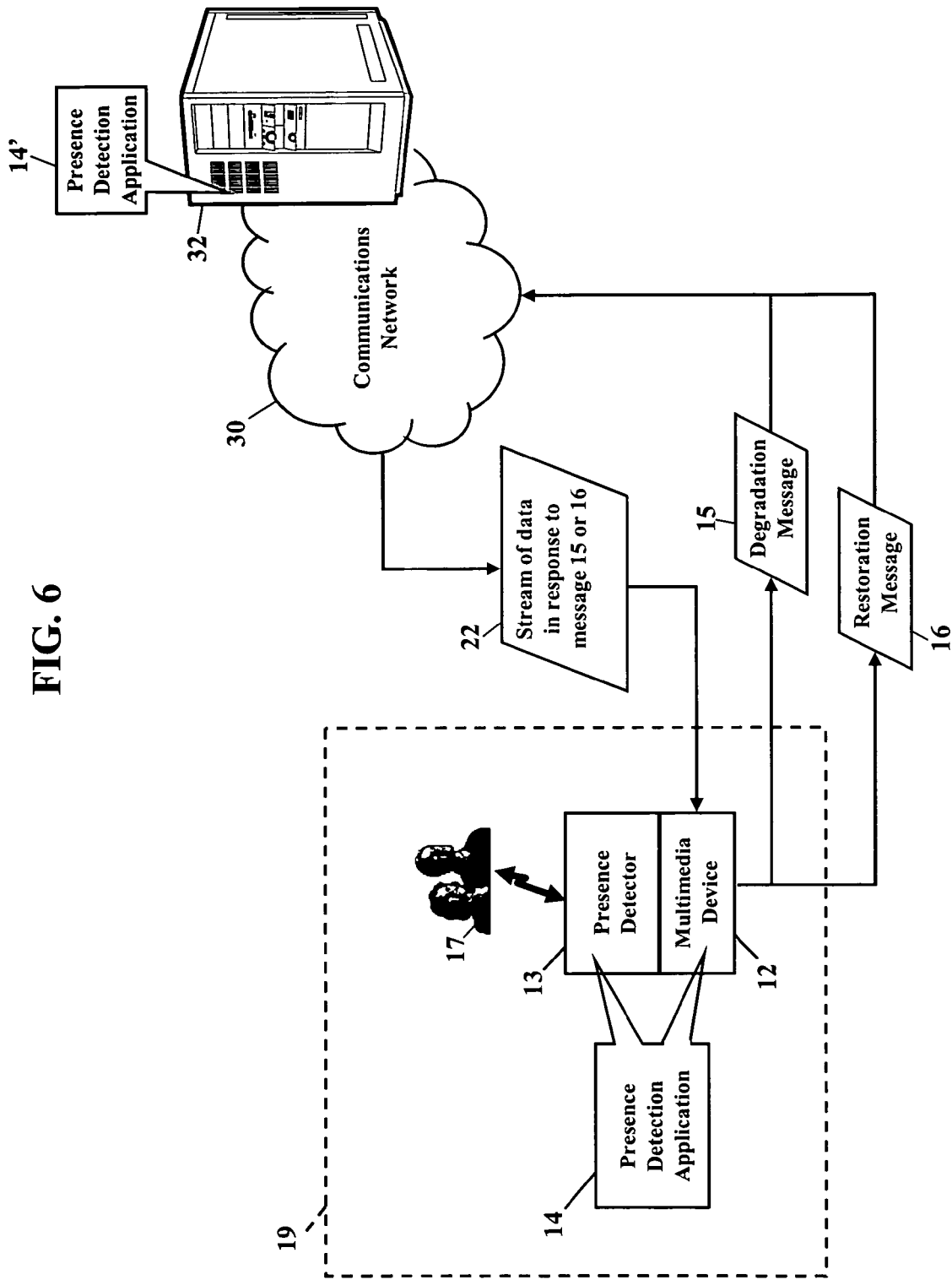
FIGS. 6-8 are schematics illustrating presence detection, degradation, and restoration according to some further exemplary embodiments.
Figure 7:
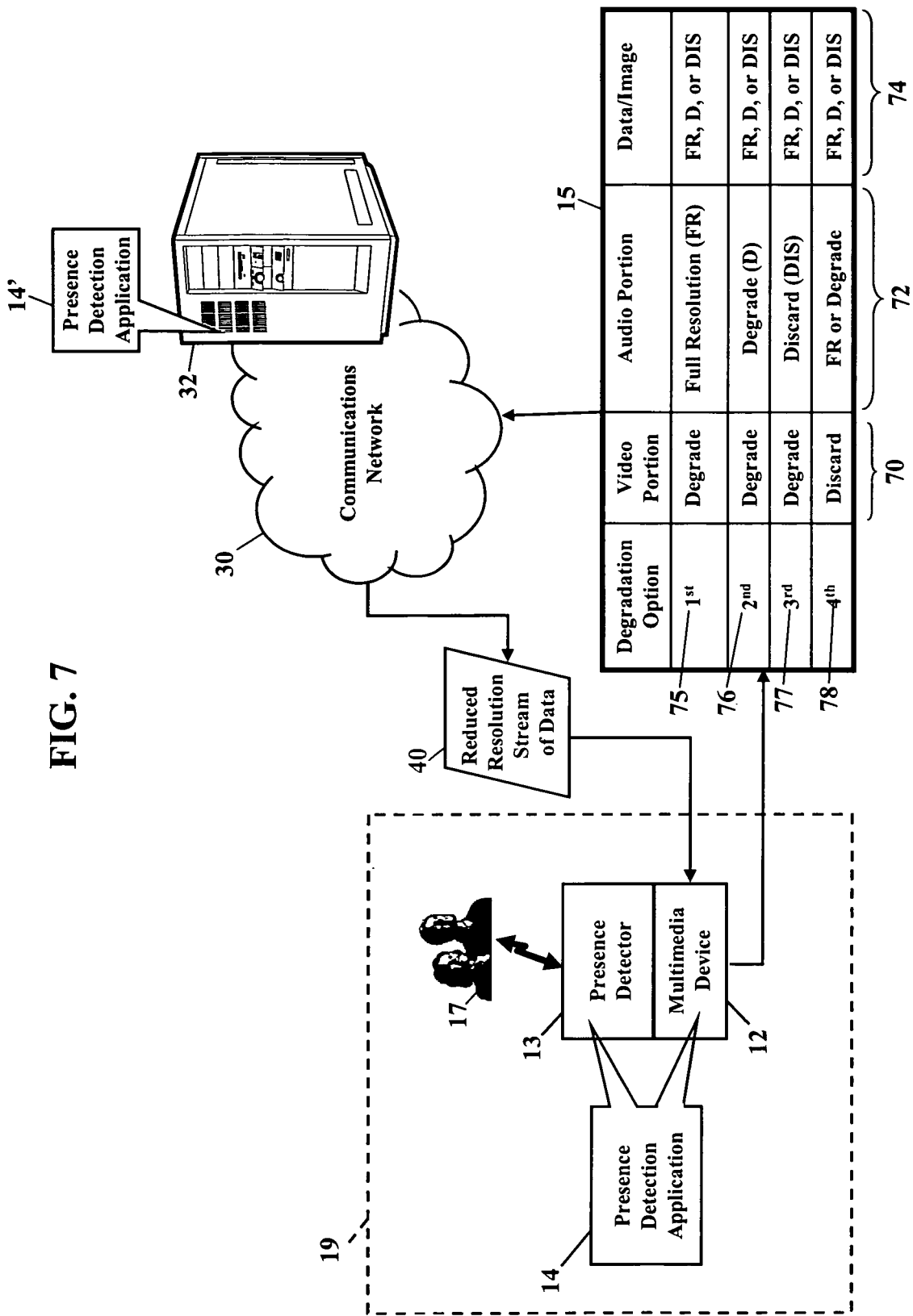
Figure 8:
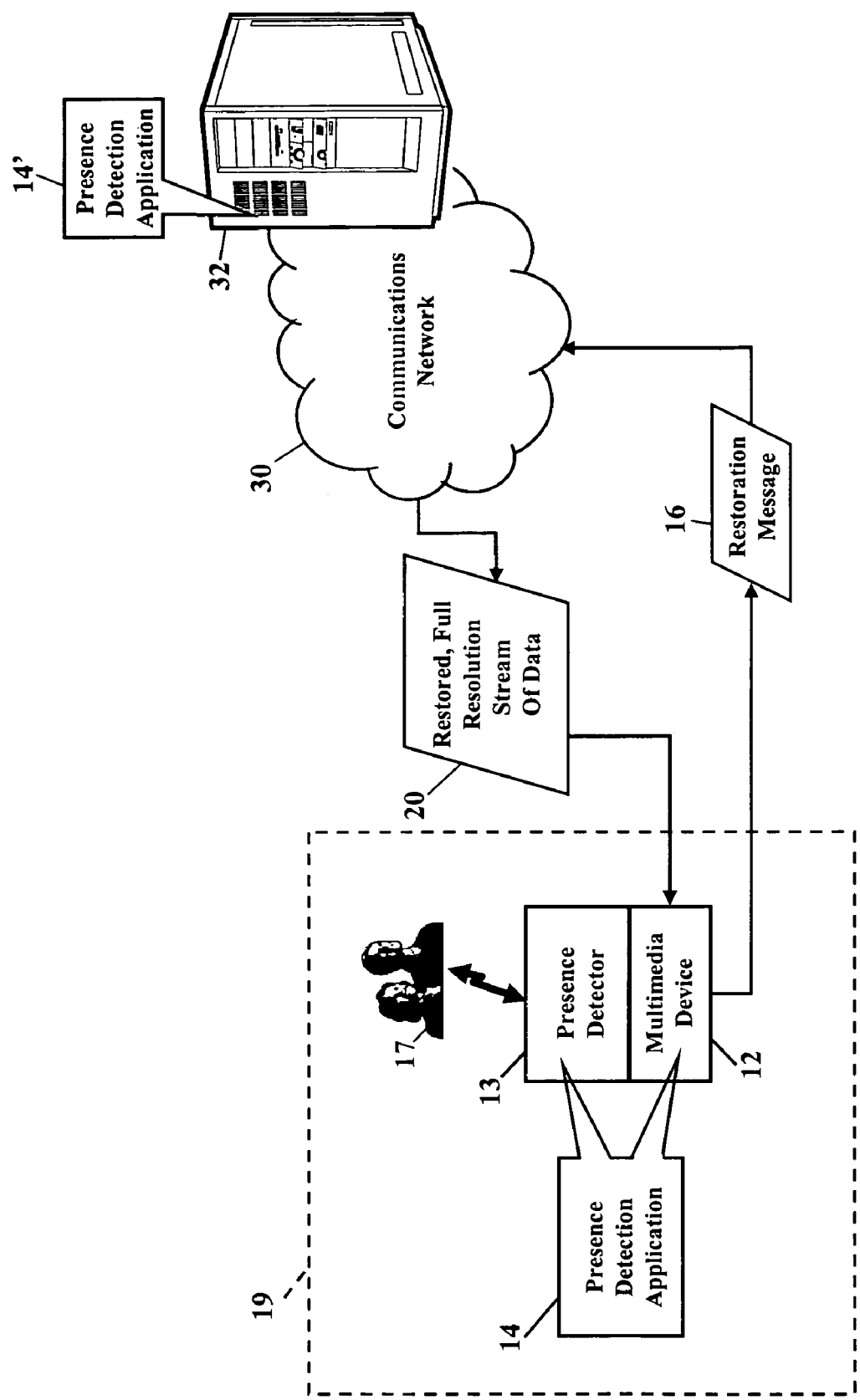

FIGS. 6-8 are schematics illustrating operating environments according to other exemplary embodiments. FIG. 6 shows an alternate home network (also referred to as a "local network") 19 that does not include the multimedia gateway 11 of the home network 10 shown in FIGS. 1-5. The multimedia device 12 itself of home network 19 directly communicates with the communications network 30 to send messages 15, 16 and to receive a stream 22 of data in response to these messages 15, 16. Similar to the above embodiments, the multimedia device 12 is coupled with the presence detector 13, and the multimedia device 12 and/or the presence detector 13 may include the presence detection application 14. The presence detector 13 detects or otherwise monitors for at least one individual 17 and operates with the presence detection application 14 to control or otherwise manage communications of the stream 22 of data.

For example, as shown in FIG. 7, when the presence of at least one individual 17 is not detected, there is no need to send a full-resolution version of the stream of data. Consequently, the presence detection application 14 sends the degradation message 15 to the server 32 via a communications link among the multimedia device 12 and the communications network 30. The degradation message 15 instructs the corresponding server-based component of the presence detection application 14' to degrade the stream of data such that a degraded stream 40 of data is then processed and communicated from the server 32 to the multimedia device 12 via the communications network 30. Similar to the above embodiments, the degraded stream 40 of data has a reduced data rate measured in bytes per second. Because the degraded stream 40 of data has a reduced data rate, the bandwidth allocated to the multimedia device 12 is reduced and available for other uses within the communications network 30.

FIG. 7 further includes a table illustrating the degradation message 15 communicated to the communications network 30 and to server 32 according to exemplary embodiments. The degradation message 15 includes instructions for degrading the original audio, video, and/or data components of the full-resolution stream of data (shown as reference numeral 20 in FIGS. 1, 5, and 8). That is, the presence detection application 14 commands or produces degradation of a video portion 70, an audio portion 72, and/or a data portion 76 of the reduced stream 40 of data communicated to the multimedia device 12 to conserve bandwidth.

As FIG. 7 illustrates, a first degradation option 75 degrades a video portion 75, maintains the audio portion 72, and maintains, degrades, or discards the data portion 76. FIG. 7 refers to "maintains" as "full resolution" or "FR," sometimes uses the abbreviation "D" for degradation, and sometimes uses the abbreviation "DIS" for discard or termination of the referred to portion. Consequently, the first degradation option may result in a smaller picture (such as reference numeral 63 shown in FIG. 11) and/or a black-and-white picture, but with full-resolution sound quality. Further, the first degradation option 75 may present the degraded video portion 70 with additional data and/or an image, such as an alert that the multimedia session is presented in a degraded format (as shown in reference numerals 64 and 65 in FIGS. 11 and 12), a navigation tool (e.g., a programming guide), and/or alternate alphanumeric data such as weather information, stock market quotes, and other data. A second degradation option 76 degrades both the video portion 70 and the audio portion 72, but maintains, degrades, or discards the data portion 74. The second degradation option 76 may result in a similar picture quality to the first degradation option 75, but the sound quality may be degraded to monophonic or other lower quality format. Similar to the above option 75, the second degradation option 76 may present the degraded video portion 70 with additional data and/or an image. A third degradation option 77 degrades the video portion 70 and discards the audio portion 72, producing a silent version of a degraded picture. Similar to the above options 75, 76, the third degradation option 77 may present the degraded video portion 70 with additional data and/or an image. A fourth degradation option 78 discards the video portion 70, maintains or degrades the audio portion 72, and maintains, degrades, and/or discards the data portion 74. The fourth degradation option 78 may conserve the most bandwidth, producing an audio version of the original stream of data along with an image or other alphanumeric text alerting an individual that the stream of data is degraded. A fifth degradation option (not shown) could discard or degrade the audio portion 72, deliver the full-resolution video portion 70, and maintain, degrade, and/or discard the data portion 74. Although this fifth option is possible, it conserves the least bandwidth. Because the audio portion 72 is relatively small when compared to the video portion 70, delivering the full-resolution video portion 70 may not appreciably conserve bandwidth, especially if the data portion consumes additional bandwidth (e.g., a stock market ticker that is always on a display device of the multimedia device).

Because the fourth degradation option 78 may conserve the most bandwidth, the fourth degradation option 78 may be established as a default. That is, unless the presence detection application 14 is otherwise configured by an individual (e.g., the subscriber or an authorized user); the presence detection application 14 automatically discards the video portion 70, delivers the audio portion 72, and maintains, degrades, and/or discards the data portion 74. When the presence detection application 14 no longer detects presence of at least one individual 17, the presence detection application 14 degrades data rates to conserve bandwidth. The multimedia device 12 thus receives an audio version of the original stream of data and may also receive a data portion including an alert that the stream of data has been altered. The audio portion 72 may be full resolution, or the audio portion 72 may be degraded to further conserve bandwidth. And, the data portion 74 may be full resolution, degraded, or discarded.

Referring now to FIG. 8, a schematic illustrating a restored stream 20 of data for the operating environment shown in FIG. 6 according to exemplary embodiments. Similar to the methods described above, the presence detection application 14 operates with the presence detector 13 to continually monitor for the presence of at least one individual 17 proximate to the multimedia device 12 or for an input to the multimedia device 12. When presence is again detected, then the presence detection application 14 causes a restoration in the data rate (e.g., bytes per second) of the stream 20 of data. The presence detection application 14 sends the restoration message 16 to the server 32, and the restoration message 16 instructs the server-based presence detection application 14' to restore the full-resolution data rate of the stream 20 of data.

Figure 9:
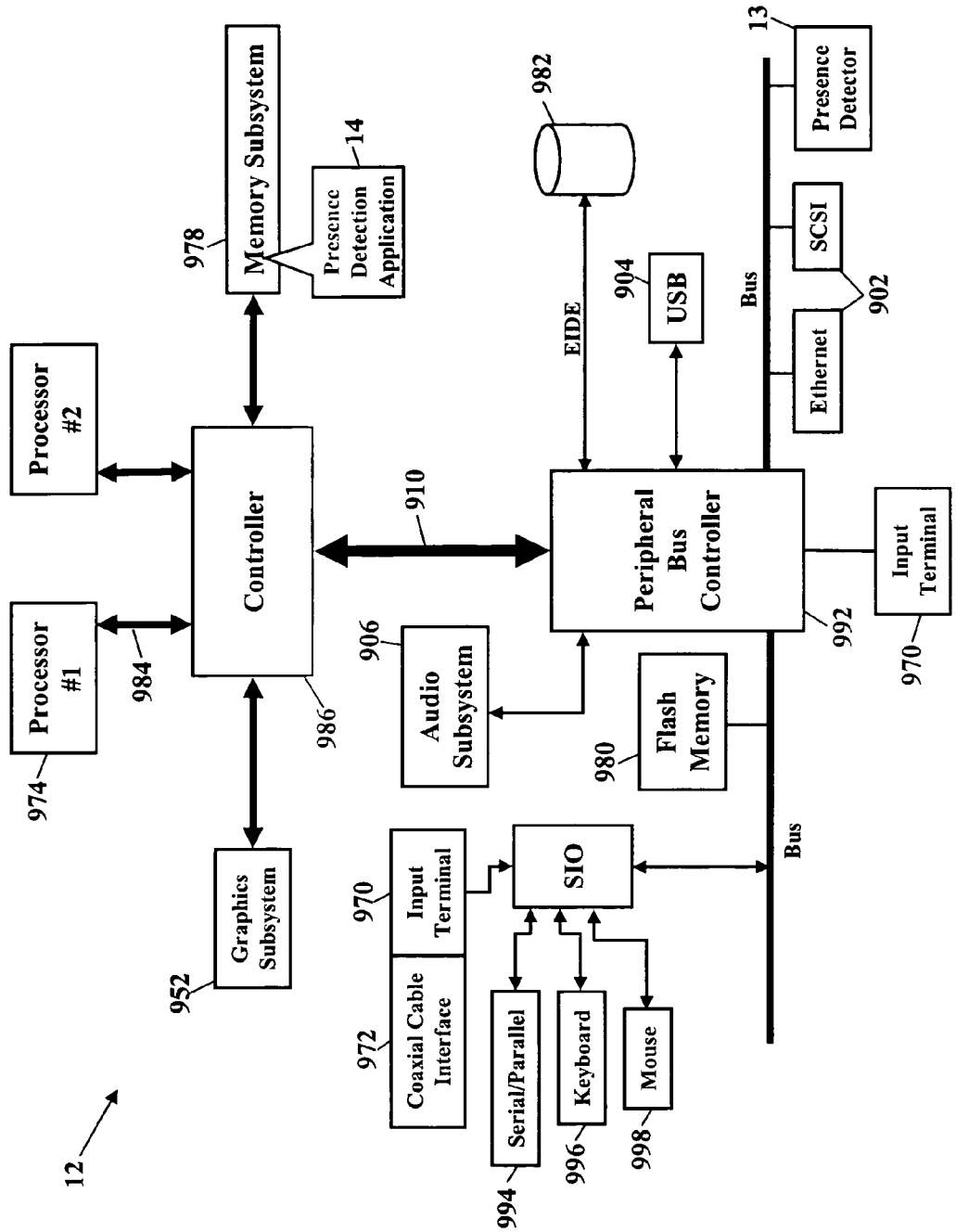
FIG. 9 is a schematic illustrating a multimedia device coupled with the presence detector according to an exemplary embodiment.

FIG. 9 is a block diagram of exemplary details of the multimedia device 12 shown in FIGS. 1-8. The multimedia device 12 can be any device, such as an analog/digital recorder, television, CD/DVD player/recorder, audio equipment, receiver, tuner, and/or any other consumer electronic device. The multimedia device 12 may also include any computer, peripheral device, camera, modem, storage device, telephone, personal digital assistant, and/or mobile phone. The multimedia device 12 may also be configured as a set-top box ("STB") receiver that receives and decodes digital signals. The multimedia device 12, in fact, can be any electronic/electrical device that has an input for receiving the stream of data (shown as reference numerals 20, 22, and 40 in FIGS. 1-8). The input may include a coaxial cable interface 972 for receiving signals via a coaxial cable (not shown). The input may additionally or alternatively include an interface to a fiber optic line, to a telephone or data line (such as an RJ-11 or RJ-45), to other wiring, and to any male/female coupling. Further input/output combinations include wireless signaling such as Bluetooth, IEEE 802.11, or infrared optical signaling. The multimedia device 12 includes one or more processors 974 executing instructions stored in a system memory device. The instructions, for example, are shown residing in a memory subsystem 978. The instructions, however, could also reside in flash memory 980 or a peripheral storage device 982. When the processor 974 executes the instructions, the processor 974 may also consult the presence detection application 14 stored in the system memory device. The processor 974, however, may additionally or alternatively consult the presence detection application 14 by communicating with the server, operating within the communications network, when conserving bandwidth (the server and the communications network are shown, respectively, as reference numerals 32 and 30 in FIGS. 1-8). The one or more processors 974 may also execute an operating system that controls the internal functions of the multimedia device 12. A bus 984 may communicate signals, such as data signals, control signals, and address signals, between the processor 974 and a controller 986. The controller 986 provides a bridging function between the one or more processors 974, any graphics subsystem 952 (if desired), the memory subsystem 978, and, if needed, a peripheral bus 910. The peripheral bus 910 may be controlled by the controller 986, or the peripheral bus 910 may have a separate peripheral bus controller 992. The peripheral bus controller 992 serves as an input/output hub for various ports. These ports include an input terminal 970 and perhaps at least one output terminal. The ports may also include a serial and/or parallel port 994, a keyboard port 996, and a mouse port 998. The ports may also include networking ports 902 (such as SCSI or Ethernet), a USB port 904, and/or a port that couples, connects, or otherwise communicates with the presence detector 13 which may be incorporated as part of the multimedia device 12 itself or which may be a separate, stand-alone device. The multimedia device 12 may also include an audio subsystem 906, which may, for example, produce sound through an embedded speaker in a set-top box, and/or through the audio system of a television. The multimedia device 12 may also include a display device (i.e., LED, LCD, plasma, and other display devices) to present instructions, messages, tutorials, and other information to a user using an embedded display. Alternatively, such instructions, may be presented using the screen of a television or other display device. The multimedia device 12 may further include one or more encoders, one or more decoders, input/output control, logic, one or more receivers/transmitters/transceivers, one or more clock generators, one or more Ethernet/LAN interfaces, one or more analog-to-digital converters, one or more digital-to-analog converters, one or more "Firewire" interfaces, one or more modem interfaces, and/or one or more PCMCIA interfaces. Those of ordinary skill in the art understand that the program, processes, methods, and systems described herein are not limited to any particular architecture or hardware.

The processors 974 may be implemented with a digital signal processor (DSP) and/or a microprocessor. Advanced Micro Devices, Inc., for example, manufactures a full line of microprocessors (Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Texas Instruments offers a wide variety of digital signal processors (Texas Instruments, Incorporated, P.O. Box 660199, Dallas, Tex. 75266-0199, Phone: 972-995-2011, www.ti.com) as well as Motorola (Motorola, Incorporated, 1303 E. Algonquin Road, Schaumburg, Ill. 60196, Phone 847-576-5000, www.motorola.com). There are, in fact, many manufacturers and designers of digital signal processors, microprocessors, controllers, and other components that are described in this patent. Those of ordinary skill in the art understand that this components may be implemented using any suitable design, architecture, and manufacture. Those of ordinary skill in the art, then understand that the exemplary embodiments are not limited to any particular manufacturer's component, or architecture, or manufacture.

The memory (shown as memory subsystem 978, flash memory 980, or peripheral storage device 982) may also contain an application program. The application program cooperates with the operating system and with a video display device to provide a Graphical User Interface (GUI). The graphical user interface provides a convenient visual and/or audible interface with a user of the multimedia device 12. For example, a subscriber or authorized user, may access a GUI for selecting a degradation profile, such as degradation options 75, 76, 77, and 78 of FIG. 7. That is, the subscriber may select or otherwise configure a degradation profile such that the detection application 14 consults the memory to access the degradation profile and such that the degradation profile provides instructions for degrading the stream of data to conserve bandwidth and/or to provide an alert or other notification to the multimedia device 12.

Figure 10:
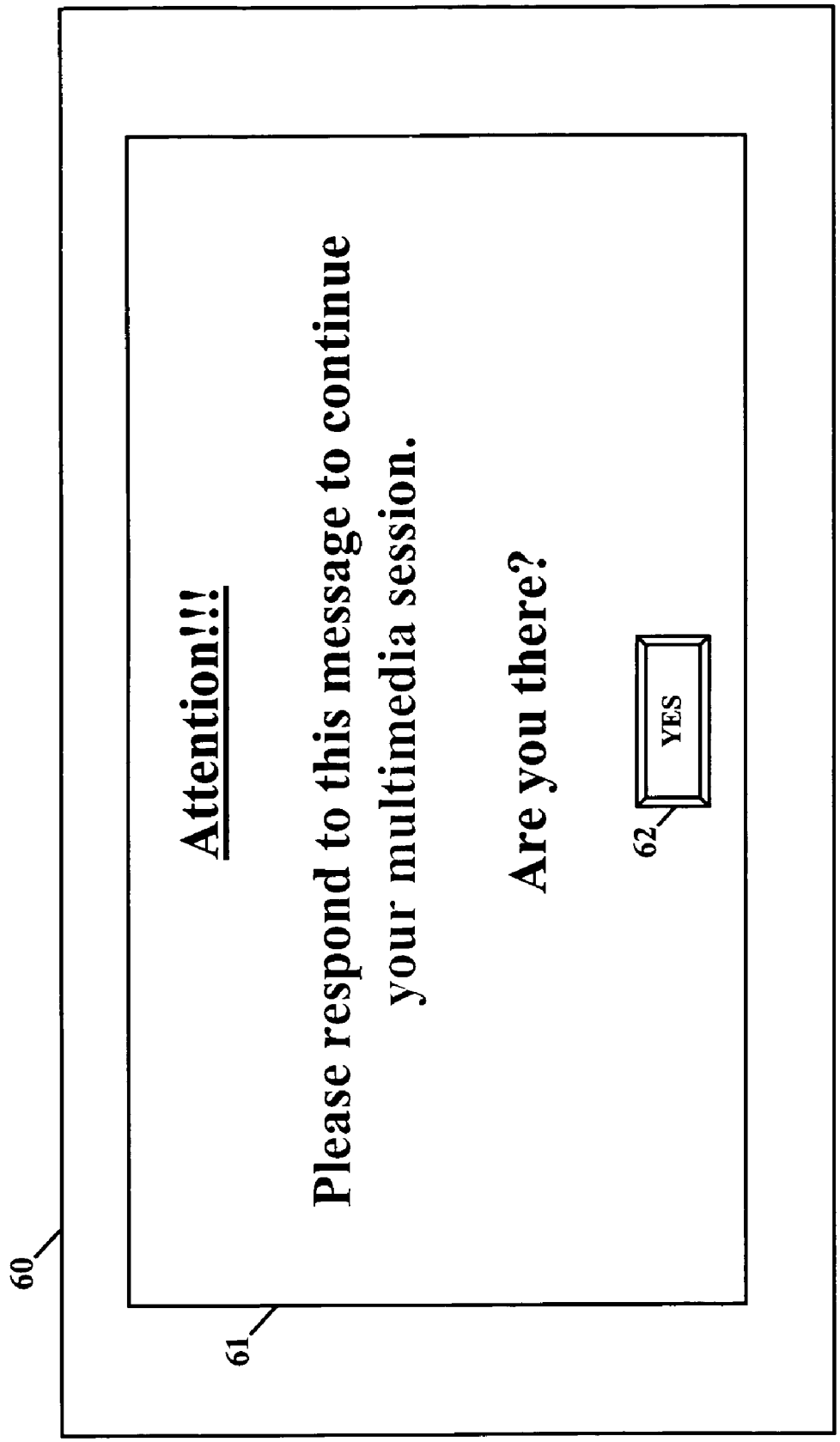
FIGS. 10-13 are schematics illustrating presentation of presence detection, degradation, and restoration sessions according to some of the exemplary embodiments.

FIG. 10 is a schematic illustrating an alert 61 to the multimedia device 12 that prompts the user to respond to the alert 61 by selecting an affirmative response 62 that indicates at least one individual is present. This alert 61 may be presented prior to communication of the degradation message 15 to the communications network 30. And, if the user responds, then the stream 20 of data remains in full resolution. If the user does not respond, then the stream 20 of data is degraded. The alert 61 may further indicate a time period to respond to the alert before the stream 20 is degraded (e.g., 90 seconds or less). Still further, the alert 61 may be overlaid onto a presentation of the stream 20 of data (or, temporarily substituted for the stream 20 of data) and flashed back and forth to provide a more visible alert. Further, the alert 61 may be presented with an audio alert as well. The audio alert may sound similar to an alarm and/or include synthesized or recorded voice that instructs the user to respond to the alert 61 to continue the media session.

Figure 11:
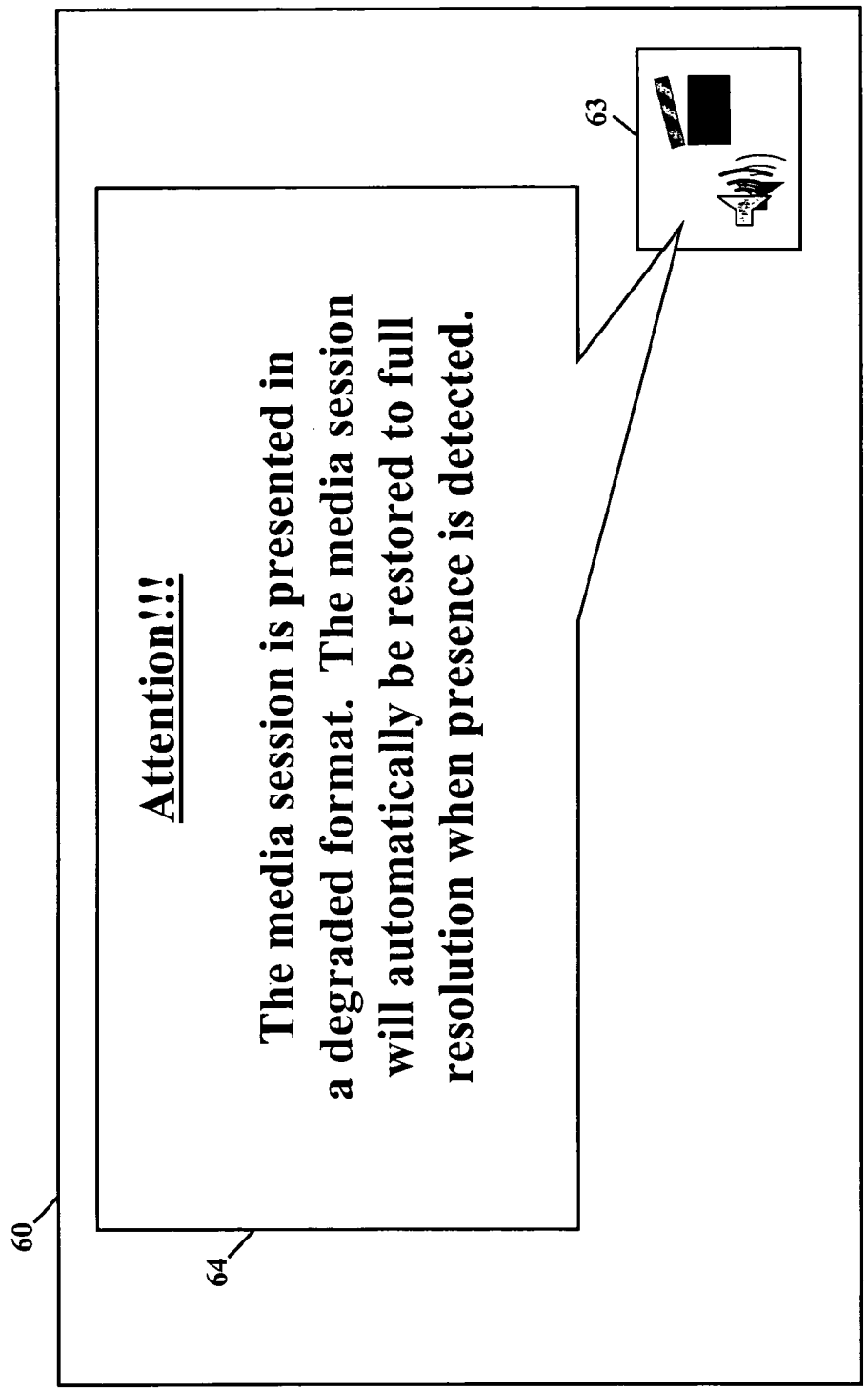
Figure 12:
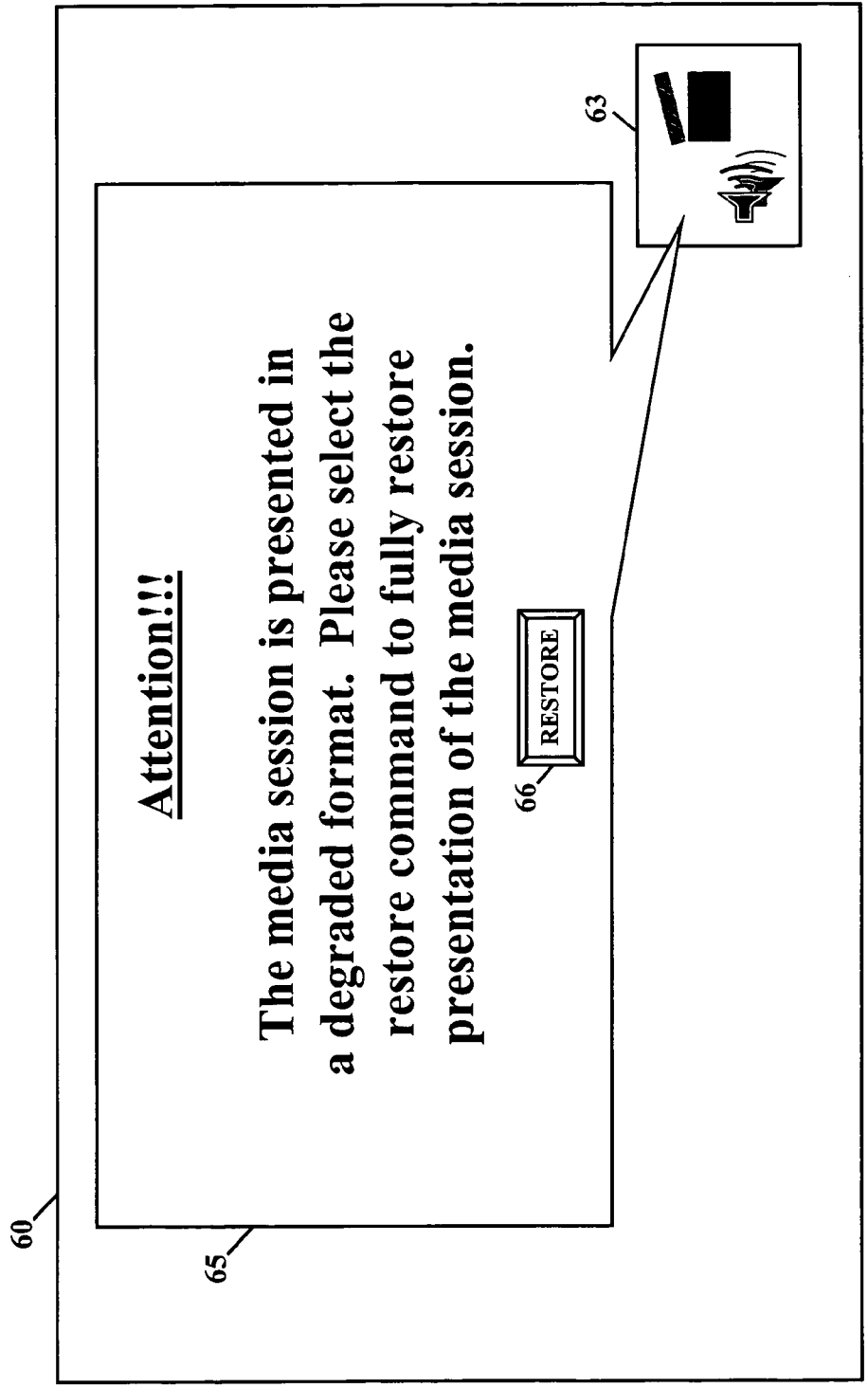
Figure 13:
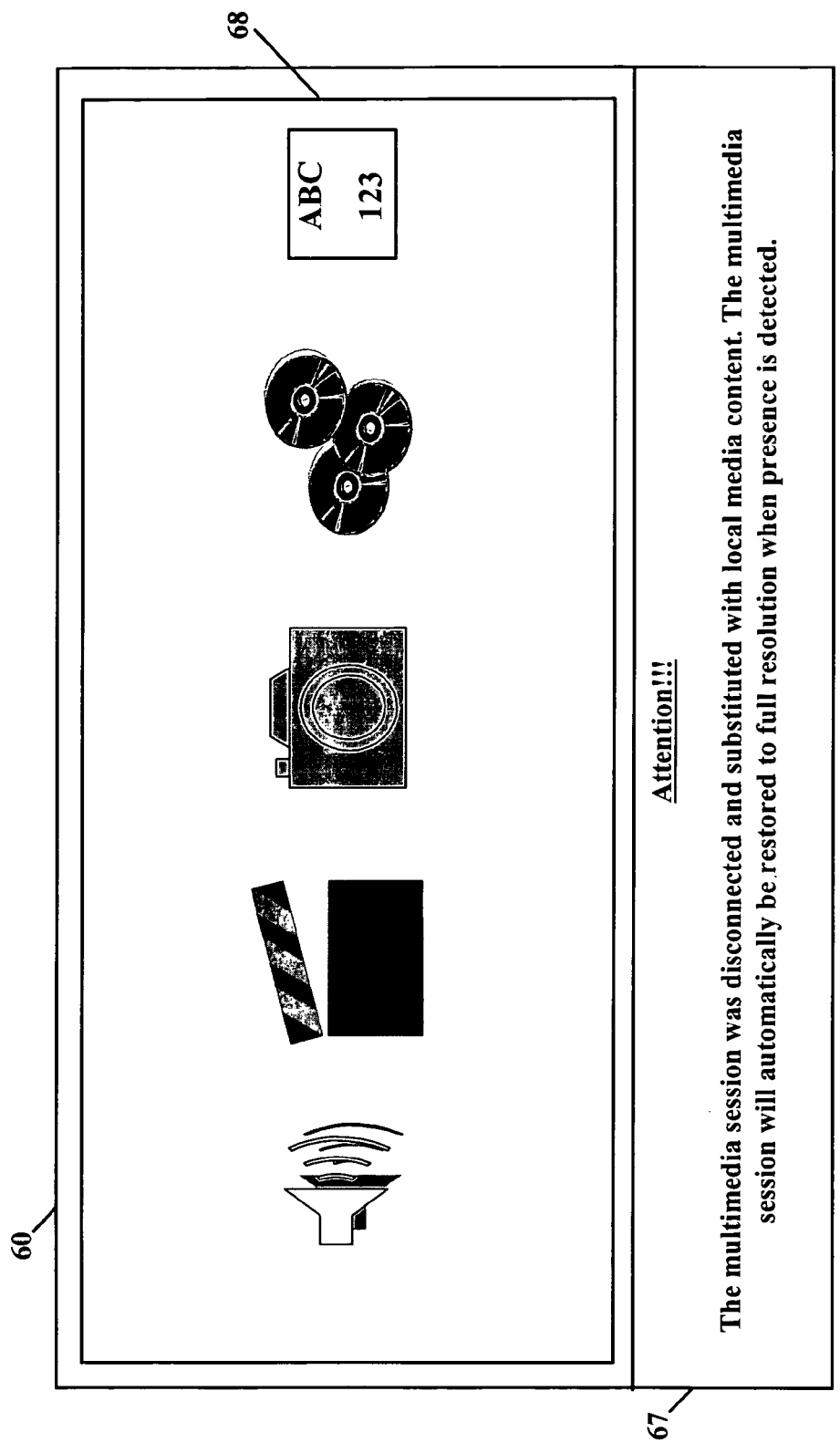

FIG. 11 illustrates a degradation presentation 1100 to the multimedia device 12 that includes a display device 60 of graphics subsystem 952. The display device 60 presents the degraded video portion 70 in a reduced picture 63 along with a message display 64 that alerts the user that the multimedia session is in a degraded format and will automatically be restored to full resolution when presence is detected. Still further, the multimedia device 12 may present full resolution or a degraded audio portion 72 with the reduced picture 63. FIG. 12 illustrates another degradation presentation 1200 to the multimedia device 12 that includes the display device 60, reduced picture 63, a notification of the degraded message 65, and a prompt 66 to select in order to restore the full resolution of the media session—that is, the alert of FIG. 12 does not automatically restore the media session, rather, the user must activate the prompt 66 in order for the restoration message 16 to be communicated to the communications network 30 to restore the media session. FIG. 13 illustrates yet another degradation presentation 1300 to the multimedia device 12 that includes the display device 60, a notification 67 that the media session was disconnected and substituted with locally stored media content until presence is re-detected, and a presentation 68 of the locally stored media content.

Figure 14:
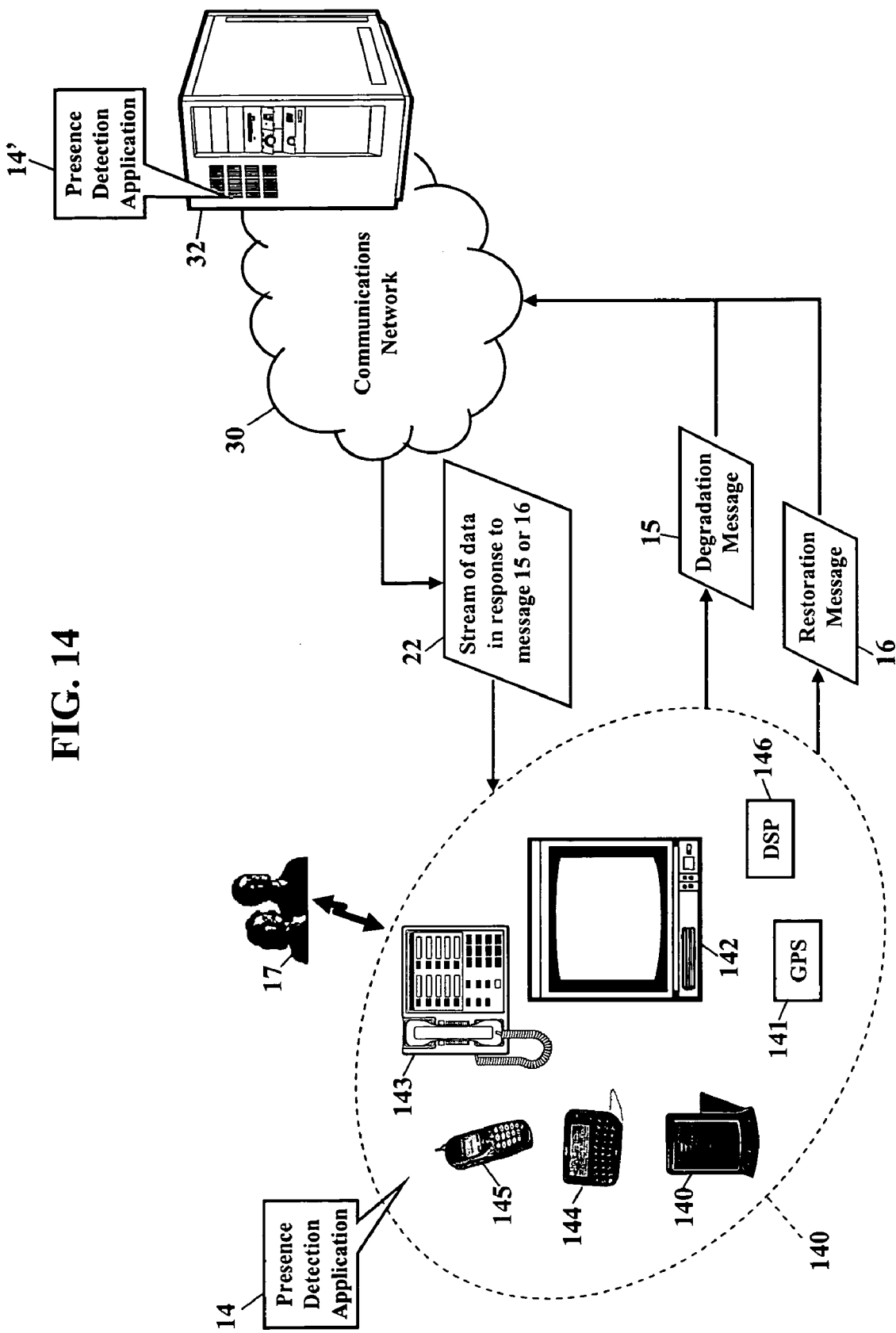
FIG. 14 is a schematic illustrating various types of integrated multimedia and presence detection devices according to some of the exemplary embodiments.

FIG. 14 is a schematic illustrating still more exemplary embodiments. FIG. 14 illustrates that the multimedia device 12 and the presence detector 13 may be an integrated device 140 that includes various types of devices. The presence detection application 14 operates within any of these various types of integrated devices 140. FIG. 14, for example, illustrates that the presence detection application 14 may entirely or partially operate within a personal digital assistant (PDA) 140, a Global Positioning System (GPS) device 141, an interactive television 142, an Internet Protocol (IP) phone 143, a pager 144, a cellular/satellite phone 145, or any computer system and/or communications device utilizing a digital signal processor (DSP) 146 when such communications device can benefit by the bandwidth management methods described herein. The integrated device 140 may also include watches, radios, vehicle electronics, clocks, printers, gateways, and other apparatuses and systems. As those of ordinary skill in the art understand, the integrated device 140 (or, alternatively, the multimedia gateway 11 and/or the communications network 30) has the intelligence for appropriate formatting and presenting the stream 20 of data or the degraded stream 40 of data. For example, if the integrated device 140 uses the Wireless Application Protocol (WAP) technique, then the stream 20 of data or the degraded 40 stream of data is formatted using the Wireless Mark-up Language (WML) and configured according to standards known in the art. The Wireless Mark-up Language (WML) and the WAP technique are known and will not be further described. This is a description of a solution for a specific wireless protocol, such as WAP. This solution may be clearly extended to other wireless protocol, such as i-mode, VoiceXML (Voice eXtensible Markup Language), Dual Tone Multi-Frequency (DTMF), and other signaling means.

FIG. 15 is a schematic illustrating simplified configurations of the presence detector 13 according to some of the exemplary embodiments. The presence detector 13 includes an emitter 151 that transmits or otherwise sends a signal, a detector 152 that detects or otherwise receives a signal or a response signal (in response to the transmitted signal from the emitter 151), and a processor 153 that executes instructions stored in a system memory device of the presence detector 13 (not shown) or of a peripheral device (e.g., the memory system of the multimedia device 12). When the processor 153 executes the instructions, the processor 153 may also consult the presence detection application 14 stored in the system memory device. The processor 153, however, may additionally or alternatively consult the presence detection application 14 by communicating with the server, operating within the communications network, when conserving bandwidth (the server and the communications network are shown, respectively, as reference numerals 32 and 30 in FIGS. 1-8). The emitter 151 and detector 152 may be an integrated device 154, such as an electrical contact(s) (e.g., entry/exit sensors that detect for an open or a closed circuit). Another configuration includes the detector 152 and the processor 153 as an integrated device 158 that detects the presence of a signal emitted independent of the integrated device 158 (e.g., a heat sensor, light sensor, and others). Yet another configuration includes the emitter 151, the detector 152, and the processor 153 as an integrated device 156 that operates with the multimedia device 12 to detect presence.

FIG. 16 is a schematic illustrating various motion detection devices and configuration options of these motion detection devices. For example, the various motion detection devices include a token or smart card system 161 that may be configured with the emitter 151 and the detector 152, a motion or movement sensing system 162 that may be configured with the emitter 151 and the detector 152, an eye movement or eye stare/target system 163 that may include the emitter 151, detector 152, and the processor 153, a heat sensor system 164 that may include the emitter 151, the detector 152, and/or the processor 153, and an entry/exit sensing system 165 that may include the emitter 151, the detector 152, and/or the processor 153. The presence detector 13 may include other detection means such as a pressure detection system (e.g., a system to detect pressure changes of an individual moving or applying a pressure on a floor or a piece of furniture proximate to the multimedia device). Because presence detection is known to those of ordinary skill in the art, presence detection will not be discussed in detail. If the reader desires a more detailed explanation of presence detection, the reader is directed to the following sources: U.S. Pat. No. 4,796,697 to Gilley et al. (Sep. 6, 1988); U.S. Pat. No. 4,907,079 to Turner et al. (Mar. 6, 1990); U.S. Pat. No. 5,278,654 to Yang (Jan. 11, 1994); U.S. Pat. No. 5,793,409 to Tetsumura (Aug. 11, 1998); U.S. Pat. No. 6,260,111 to Craig et al. (Jul. 10, 2001); and U.S. patent application Ser. No. 2004/0183749 to Vertegaal (Sep. 23, 2004), with each incorporated herein by reference in their entirety.

FIG. 17 is a flowchart illustrating a method of conserving bandwidth, according to exemplary embodiments. A presence of at least one individual person is monitored or detected (Block 1700). Presence may be detected by detecting, for example, a token (Block 1701), a motion sensor (Block 1702), an eye movement sensor (Block 1703), a heat sensor (Block 1704), and by triggering a sensor for entry or exit (Block 1705). If the presence of at least one individual is detected (Block 1706), then a full-resolution stream of data is delivered to the multimedia device, or, alternatively, to a multimedia gateway (Block 1708). If, however, the presence of at least one individual is not detected (Block 1706), then a degradation profile is accessed to degrade the stream of data and, thus, conserve bandwidth (Block 1710). A video portion of the stream of data may be degraded (shown as "D" in FIG. 17), an audio portion of the stream of data is presented in full resolution (shown as "FR" in FIG. 17 and also referred to herein as "maintain"), and a data portion is presented in full resolution or degraded (Block 1712). A video portion of the stream of data is degraded, an audio portion of the stream of data is degraded, and a data portion is presented in full resolution, degraded, and/or discarded (shown as "DIS" in FIG.

17). As used herein, the term "discarded" means that the portion has been canceled or otherwise terminated. Another option is to present a degraded video portion, discard the audio portion, and maintain, discard, or degrade the data portion (Block 1716). Yet another option is to discard the video portion, maintain or degrade the audio portion, and maintain, degrade, and/or discard the audio portion (Block 1718). If the media session continues (Block 1720), then a presence detection application continues to interact with the multimedia device to present, degrade, and restore the media upon monitoring or detecting the presence of at least one individual. If the media session ends (Block 1720), then the method stops.

According to further exemplary embodiment, the presence detection application 14 of the multimedia device 12 or the presence detector 13 may also include instructions for degrading or otherwise receiving the stream 20 of data such that a degraded stream 40 of data has reduced data rate measured in bytes per second. That is, rather than the server-based component of the presence detection application 14' to altering the stream 20 of data such that a degraded stream 40 of data is then processed and communicated from the server 32 to the multimedia device 12 or to the multimedia gateway 11 via the communications network 30, the presence detection application 14 of the multimedia device or the presence detector 13 includes instructions for receiving the next stream of data (i.e., the degraded stream 40 of data) that degrades or otherwise filters the full resolution stream 20 of data from the communications network such that the next stream of data has a reduced data rate and, consequently, bandwidth is reduced and locally allocated to the multimedia 12 or to the presence detector 13 for other uses. Similarly, the presence detection application 14 of the multimedia device 12 or the presence detector 13 may also include instructions for restoring the stream 40 of degraded data when the presence of at least one individual is detected. That is, rather than the server-based presence detection application 14' restoring the full-resolution data rate of the stream 20 of data, the presence detection application 14 of the multimedia device or the presence detector 13 includes instructions for receiving the next stream of data in full resolution.

The presence detection application (shown as reference numerals 14 and 14' in FIGS. 1-9 and 14) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the embodiments, allow the presence detection application to be easily disseminated. A computer program product for conserving bandwidth comprises the computer-readable medium, and the presence detection application stores on the computer-readable medium. The presence detection application comprises computer code for detecting the presence of a multimedia device. If a presence of a multimedia device is detected, then a stream of data is delivered to the multimedia device. If the presence of at least one individual proximate to the multimedia device is not detected, then the stream of data is degraded to conserve bandwidth.

The presence detection application (shown as reference numerals 14 and 14' in FIGS. 1-9 and 14) may also be physically embodied on or in any addressable (e.g., HTTP, I.E.E.E. 802.11, Wireless Application Protocol (WAP)) wire line or wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method to conserve bandwidth, comprising:
receiving information indicating whether a presence of an individual is detected;
if the presence of the individual is detected, then delivering a stream of data to a multimedia device;
if the presence of the individual is not detected, then degrading the stream of data to a degraded stream of data and delivering the degraded stream of data to the multimedia device to conserve bandwidth, the multimedia device being powered on;
wherein the degraded stream of data comprises a discarded audio portion of the stream of data and a discarded video portion of the stream of data;
prior to delivering the degraded stream of data, displaying a first message which asks the individual to indicate its presence to prevent delivering the degraded stream of data;
when delivering the degraded stream of data, displaying a second message to the individual indicating: that the degraded stream of data is being presented and that that the degraded stream of data will be automatically restored when the presence of the individual is detected; and
when delivering the degraded stream of data, displaying a third message to the individual indicating select a restore button displayed on the multimedia device to change from the degraded stream of data to the stream of data.

2. The method of according to claim 1, further comprising:
detecting the presence of the individual by monitoring a state of a multimedia device to determine power consumption
wherein the first message is displayed before receiving information indicating whether the presence of the individual is detected.

3. The method according to claim 1, wherein the degraded stream of data comprises a degraded video portion of the stream of data.

4. The method according to claim 1, wherein the degraded stream of data comprises a full resolution data portion of the stream.

5. The method according to claim 1, wherein receiving information includes receiving a signal sent from an emitter device to a detector device to determine the presence of the individual proximate to the multimedia device.

6. The method according to claim 5, wherein the emitter device is coupled with a selection from the group of a token, a smart card, an infrared device, a pressure-sensing device, and a device capable of generating the signal when proximate to the multimedia device.

7. The method according to claim 1, further comprising detecting the presence of individual using an eye sensory detection system to detect an eye movement of the individual which indicates the presence proximate to the multimedia device.

8. The method according to claim 1, further comprising: presenting the degraded stream of data and a notification message for display to a user of the multimedia device, the notification message providing an alert that the stream of data has been degraded.

9. The method according to claim 8, further comprising: presenting a restoration prompt to the multimedia device such that selection of the restoration prompt fully restores the degraded stream of data.

10. The method of claim 2, further comprising: detecting the presence of the multimedia device by measuring current, voltage, resistance, electromagnetic field, or frequency of the multimedia device.

11. A device, comprising:
a processor communicating with means for detecting presence of an individual proximate to a multimedia device;
the processor commanding delivery of a stream of data to the multimedia device;
if the presence of the individual is not detected, then the processor degrading the stream of data to a degraded stream of data and delivering the degraded stream of data to the multimedia device to conserve bandwidth, the multimedia device being powered on;
wherein the degraded stream of data comprises a discarded audio portion of the stream of data and a discarded video portion of the stream of data;
prior to delivering the degraded stream of data, the processor displaying a first message which asks the individual to indicate its presence to prevent delivering the degraded stream of data;
when delivering the degraded stream of data, the processor displaying a second message to the individual indicating: that the degraded stream of data is being presented and that that the degraded stream of data will be automatically restored when the presence of the individual is detected; and
when delivering the degraded stream of data, displaying a third message to the individual indicating select a restore button displayed on the multimedia device to change from the degraded stream of data to the stream of data.

12. The device according to claim 11, wherein the degraded stream of data comprises a degraded video portion of the stream of data.

13. The device according to claim 11, wherein the degraded stream of data comprises a degraded video portion of the stream of data.

14. The device according to claim 11, wherein the degraded stream of data comprises a full resolution data portion of the stream of data.

15. The device according to claim 11, wherein the degraded stream of data comprises a degraded data portion of the stream of data.

16. The device according to claim 11, the means for detecting presence of the individual proximate to a multimedia device comprising:
an emitter device and a detector device, the emitter device and the detector device communicating a signal to determine the presence of the individual proximate to the multimedia device, wherein the emitter device comprises a token, a smart card, an infrared device, a pressure-sensing device, and a device capable of generating the signal when proximate to the multimedia device;
a motion sensory system to detect the presence of the individual proximate to the multimedia device;
an eye sensory detection system to detect an eye movement of the individual proximate to the multimedia device to detect presence;
a heat sensory detection system to detect the presence of the individual proximate to the multimedia device; and
an entry/exit detection system to detect the presence of the individual proximate to the multimedia device.

17. A computer program product, tangibly embodied on a computer readable medium, the computer program product including instructions for causing a computer having a processor to execute a method for conserving bandwidth based on presence detection, comprising:
if a presence of an individual proximate to a multimedia device is detected, delivering a stream of data to the multimedia device;
if the presence of the individual is not detected, degrading the stream of data to a degraded stream of data and delivering the degraded stream of data to the multimedia device to conserve bandwidth, the multimedia device being powered on;
wherein the degraded stream of data comprises a discarded audio portion of the stream of data and a discarded video portion of the stream of data;
prior to delivering the degraded stream of data, displaying a first message which asks the individual to indicate its presence to prevent delivering the degraded stream of data;
when delivering the degraded stream of data, displaying a second message to the individual indicating: that the degraded stream of data is being presented and that that the degraded stream of data will be automatically restored when the presence of the individual is detected; and
when delivering the degraded stream of data, displaying a third message to the individual indicating select a restore button displayed on the multimedia device to change from the degraded stream of data to the stream of data.

18. The computer program product according to claim 17, wherein the degraded stream of data comprises a degraded video portion of the stream of data.

19. The computer program product according to claim 17, further comprising instructions for performing the following: presenting the degraded stream of data and a notification message to the multimedia device, the notification message providing an alert that the stream of data has been degraded.

20. The computer program product according to claim 17, further comprising instructions for performing the following: presenting a restoration prompt to the multimedia device such that selection of the restoration prompt fully restores the degraded stream of data.

* * * * *